US012399357B2

United States Patent
Gifford et al.

(10) Patent No.: US 12,399,357 B2
(45) Date of Patent: Aug. 26, 2025

(54) DIRECTING LIGHT INTO AN OPTICAL FIBER

(71) Applicant: Intuitive Surgical Operations, Inc., Sunnyvale, CA (US)

(72) Inventors: Dawn K. Gifford, Blacksburg, VA (US); Mark E. Froggatt, Blacksburg, VA (US); Eric E. Sanborn, Blacksburg, VA (US); Brooks Childers, Christiansburg, VA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 357 days.

(21) Appl. No.: 18/008,094

(22) PCT Filed: Jun. 2, 2021

(86) PCT No.: PCT/US2021/035519
§ 371 (c)(1),
(2) Date: Dec. 2, 2022

(87) PCT Pub. No.: WO2021/247754
PCT Pub. Date: Dec. 9, 2021

(65) Prior Publication Data
US 2023/0152568 A1    May 18, 2023

Related U.S. Application Data

(60) Provisional application No. 63/034,277, filed on Jun. 3, 2020.

(51) Int. Cl.
G02B 21/00 (2006.01)
G02B 6/35 (2006.01)
G02B 21/06 (2006.01)

(52) U.S. Cl.
CPC ......... *G02B 21/06* (2013.01); *G02B 21/0076* (2013.01)

(58) Field of Classification Search
CPC .. G02B 21/06; G02B 21/0076; G02B 6/3512; G02B 6/3526; G02B 6/4214; G02B 6/422; G02B 6/32; G02B 6/264
See application file for complete search history.

(56) References Cited

U.S. PATENT DOCUMENTS

| 4,208,094 A | 6/1980 | Tomlinson, III et al. |
| 4,421,383 A | 12/1983 | Carlsen |

(Continued)

FOREIGN PATENT DOCUMENTS

| CN | 110632714 A | 12/2019 |
| EP | 3563119 A1 | 11/2019 |

(Continued)

OTHER PUBLICATIONS

International Search Report and Written Opinion for International Application PCT/US2021/035519 dated Oct. 6, 2021, 11 pages.

(Continued)

*Primary Examiner* — Mustak Choudhury
(74) *Attorney, Agent, or Firm* — Schwegman, Lundberg & Woessner, P.A.

(57) ABSTRACT

A system can direct light into an optical fiber. Imaging optics can form an image of an end of an optical fiber. An actuatable optical element can be configured to define an optical path that extends to the actuatable optical element and further extends to the end of the optical fiber. A processor can determine a location in the image of a specified feature in the image. The processor can cause, based on the location of the specified feature in the image, the actuatable optical element to actuate to align the optical path to a core of the optical fiber. A light source can direct a light (Continued)

beam along the optical path to couple into the core of the optical fiber.

20 Claims, 13 Drawing Sheets

(56) References Cited

U.S. PATENT DOCUMENTS

| | | | |
|---|---|---|---|
| 4,534,616 A | | 8/1985 | Bowen et al. |
| 4,707,063 A | | 11/1987 | Plummer |
| 4,828,353 A | | 5/1989 | Yamaguchi et al. |
| 5,907,405 A | * | 5/1999 | Mizutani ............. G03F 7/70425 356/624 |
| 6,012,852 A | | 1/2000 | Kadar-Kallen et al. |
| 6,320,993 B1 | * | 11/2001 | Laor .................. H04Q 11/0005 385/20 |
| 6,567,574 B1 | | 5/2003 | Ma et al. |
| 7,031,567 B2 | | 4/2006 | Grinderslev et al. |
| 7,772,541 B2 | | 8/2010 | Froggatt et al. |
| 7,775,725 B2 | | 8/2010 | Grinderslev |
| 7,781,724 B2 | | 8/2010 | Childers et al. |
| 8,041,173 B2 | | 10/2011 | Imamura |
| 8,457,458 B2 | | 6/2013 | Kadar-Kallen et al. |
| 8,511,909 B2 | | 8/2013 | Kadar-Kallen et al. |
| 8,531,655 B2 | | 9/2013 | Klein et al. |
| 8,773,650 B2 | | 7/2014 | Froggatt et al. |
| 9,784,569 B2 | | 10/2017 | Froggatt et al. |
| 10,299,661 B2 | | 5/2019 | Van Putten et al. |
| 10,682,197 B2 | * | 6/2020 | Trulson ................ A61B 5/0059 |
| 11,035,699 B2 | | 6/2021 | Froggatt et al. |
| 2004/0202407 A1 | | 10/2004 | Hoke |
| 2013/0044978 A1 | | 2/2013 | DeDobbelaere et al. |
| 2018/0083607 A1 | | 3/2018 | Xia et al. |
| 2019/0011720 A1 | * | 1/2019 | Ishigaki ............. G02B 27/0972 |
| 2019/0271815 A1 | | 9/2019 | Van Der Mark et al. |
| 2020/0278641 A1 | * | 9/2020 | Kondo ................ G03H 1/0005 |
| 2021/0172768 A1 | | 6/2021 | Froggatt et al. |

FOREIGN PATENT DOCUMENTS

| | | |
|---|---|---|
| JP | 2002519710 A | 7/2002 |
| JP | 2004310104 A | 11/2004 |
| WO | WO-2018125713 A1 | 7/2018 |
| WO | WO-2021247754 A1 | 12/2021 |

OTHER PUBLICATIONS

Vertut, J, and Coiffet, P., "Robot Technology: Teleoperation and Robotics Evolution and Development," English translation, Prentice-Hall, Inc., Inglewood Cliffs, NJ, USA 1986, vol. 3A, 332 pages.
International Preliminary Report on Patentability for Application No. PCT/US2021/035519 mailed Dec. 15, 2022, 08 pages.

* cited by examiner

DIRECTING LIGHT INTO AN OPTICAL FIBER

CROSS-REFERENCE TO RELATED APPLICATION

This application is a U.S. National Stage Filing under 35 U.S.C. 371 from International Application No. PCT/US2021/035519, filed on Jun. 2, 2021, and published as WO 2021/247754 A1 on Dec. 9, 2021, which claims the benefit of U.S. Provisional Application No. 63/034,277, filed Jun. 3, 2020, each of which is incorporated by reference in its entirety.

FIELD OF THE DISCLOSURE

The present disclosure relates to an optical system that can direct light into an optical fiber.

BACKGROUND OF THE DISCLOSURE

An optical system can use an optical fiber, such as a single-mode fiber. Misalignment of a light beam, with respect to a core of the single-mode fiber, can reduce the coupling efficiency of the beam into the core, and can increase losses in the optical system.

SUMMARY OF THE INVENTION

In an example, a system can direct light into an optical fiber. The system comprises imaging optics, an actuatable optical element, a processor, and a light source. The imaging optics is configured to form an image of an end of an optical fiber. The actuatable optical element is configured to define an optical path that extends to the actuatable optical element and further extends to the end of the optical fiber. The processor is configured to determine a location in the image of a specified feature in the image. The processor is further configured to cause, based on the location of the specified feature in the image, the actuatable optical element to actuate to align the optical path to a core of the optical fiber. The light source is configured to direct a light beam along the optical path to couple into the core of the optical fiber.

In another example, a method is for operating a system to direct light into an optical fiber. The system comprises imaging optics, a processor, and an actuatable optical element. The actuatable optical element defines an optical path, the optical path extending to the actuatable optical element and further extending to the end of the optical fiber. The method comprises: generating, with the imaging optics, an image of an end of the optical fiber; determining, with the processor, a location in the image of a specified feature in the image; causing, with the processor, the actuatable optical element to actuate to align the optical path to a core of the optical fiber based on the location of the specified feature in the image; and directing a light beam along the optical path to couple into the core of the optical fiber.

In another example, a computer-readable medium stores instructions that, when executed by a processor of a system for directing light into an optical fiber, can cause the processor to execute operations, such as the method described above or described elsewhere in this description.

BRIEF DESCRIPTION OF THE DRAWINGS

Corresponding reference characters indicate corresponding parts throughout the several views. Elements in the drawings are not necessarily drawn to scale. The configurations shown in the drawings are merely examples and should not be construed as limiting the scope of the invention in any manner.

Figure 1:
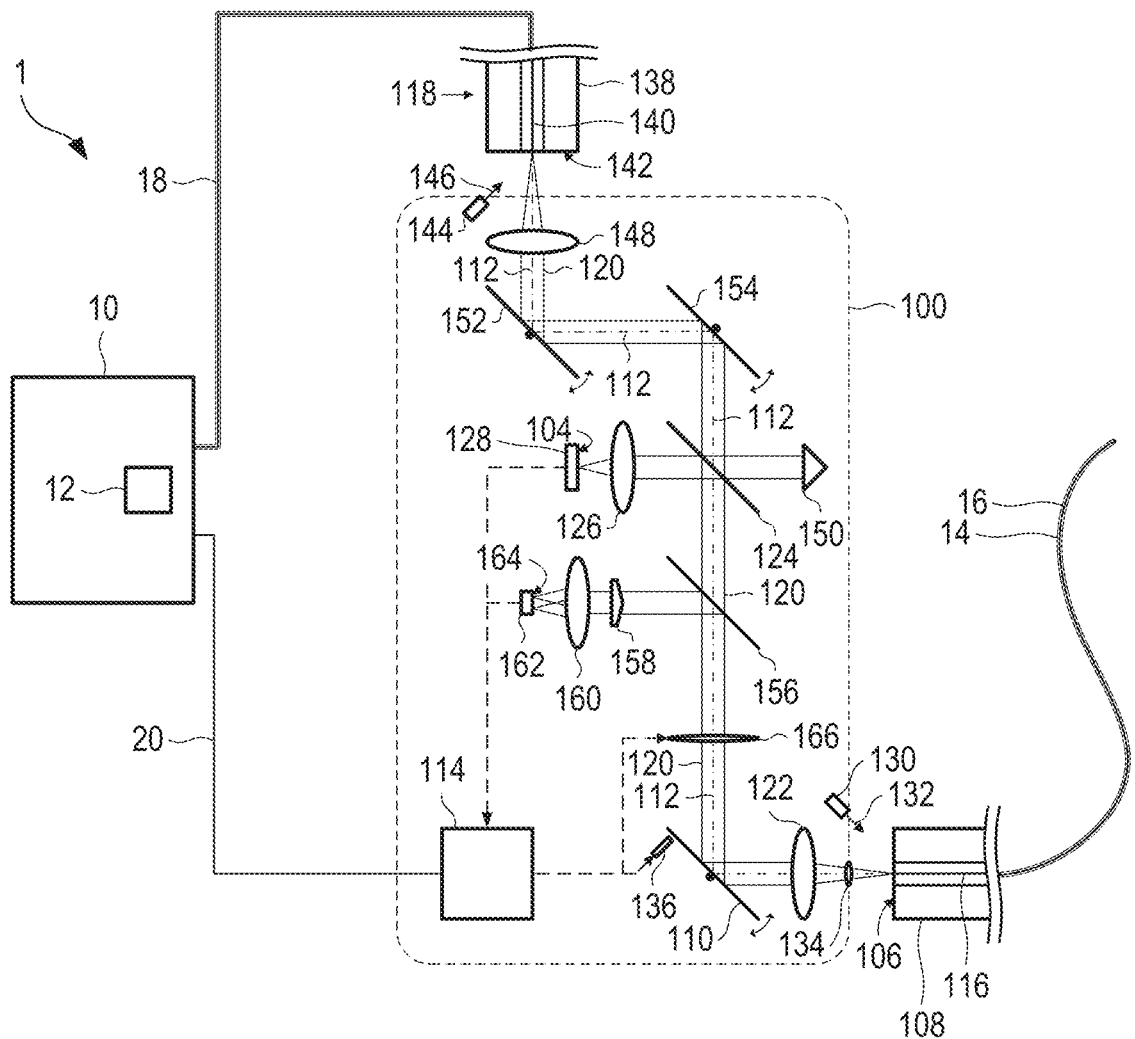
FIG. 1 shows a schematic drawing of an example of an apparatus that includes a system for directing light into an optical fiber.

DETAILED DESCRIPTION in an example, a system can direct light into an optical fiber. Imaging optics can form an image of an end of an optical fiber. An actuatable optical element can define an optical path that extends to the actuatable optical element and further extends to the end of the optical fiber. A processor can determine a location in the image of a specified feature in the image. The processor can cause, based on the location of the specified feature in the image, the actuatable optical element to actuate to align the optical path to a core of the optical fiber. A light source can direct a light beam along the optical path to couple into the core of the optical fiber.

The system can identify a feature in an image of the end of the optical fiber, then use the location of the feature to actively align an optical path to a core of the optical fiber. With active alignment, the system can improve the robustness of the alignment of the light beam to the core of the optical fiber. Improved robustness of alignment can help compensate for misalignments due to physical misalignment of the optical fiber, such as due to manufacturing tolerances, non-idealities in the mounting of a mechanical holder, and so forth. As a result, the system can achieve a higher coupling efficiency of the beam into the core of the optical fiber compared to an otherwise identical system not utilizing this technique.

Further, in various examples, the active alignment can be performed one or more times for each use of a system. Active alignment can be performed before and/or during use of the system. As a specific example, active alignment performed one or more times during operation, can help improve or maintain the alignment while an optical system is in operation. For example, during operation, an optical system can experience movement, temperature change, physical shock or vibration (such as caused by air currents), and/or other environmental or physical change that affects the alignment. The system described below can compensate periodically, in response to a determination of misalignment, or in real time for the environmental or physical change and can help improve or maintain sufficiently high coupling while the optical system is used. The term "sufficiently high" is used here to indicate sufficient coupling to enable the system to function at a performance level (e.g., regarding resolution, accuracy, power consumption, and so forth) for which the system is designed.

Further, the system can help achieve sufficiently high coupling efficiency without directly contacting the end of the optical fiber. Because the system uses contactless alignment of the optical path to the fiber, the system can help reduce contamination, physical wear, and the like of the end of the optical fiber.

An example of an optical system that can incorporate one or more features from the system shown below is an optical fiber-based strain, temperature, or shape sensing system. As a specific example, an optical system couples light into a multi-core optical fiber to sense, in real time or near real-time, a three-dimensional position in space of an element. As another specific example, an optical system couples light into a multi-core optical fiber to sense, in real time or near real-time, a three-dimensional shape of the optical fiber.

Further, an example of an optical system can include a medical or non-medical system. An example of a medical system can include those used for diagnosis or therapy, including surgical systems. In a medical system example, the system described below can be located in an optical path between one or more light sources and one or more cores of a sensing optical fiber, to help establish and/or maintain sufficiently high coupling efficiency (or coupling efficiencies) of light entering the sensing optical fiber over the course of one or more medical procedures. This is but one example of use for the system described in detail below. Other uses are also possible.

FIG. 1 shows a schematic drawing of an example of an apparatus 1 that includes a system 100 for directing light into an optical fiber. Because the system 100 can identify a feature in an image of the end of the optical fiber, then use the location of the feature to actively align an optical path to a core of the optical fiber, the system can achieve a relatively robust alignment of a light beam to the core of the optical fiber.

A controller 10 can include various optical and electronic components. For medical applications, the controller 10 can be configured as a piece of capital equipment, which can be used and reused for multiple procedures. For applications directed to shape sensing, such as sensing a three-dimensional orientation or shape of an optical fiber, the controller 10 can include a interrogator 12. The interrogator 12 can direct light into a fiber and analyze light returning from the fiber. The interrogator 12 can use a technique, such as optical frequency domain reflectometry (OFDR), to determine a three-dimensional position of an optical fiber.

In some examples, a portion of the equipment can be configured as a replaceable element, which can be used for a part of a procedure or several procedures, or for the entirety of one or several procedures, then discarded. The replaceable element can include a catheter 14, which can include a sensing optical fiber 16 that extends along at least part of the length of the catheter 14. In a medical example, the catheter 14 and sensing optical fiber 16 can be maintained or reprocessed in a clean environment, or in a sterile environment if clinically required, prior to use.

The system 100 described in detail below can use active alignment to optically connect the optical fiber 16 to the controller 10. When optically connected, the interrogator 12 can direct light into the sensing optical fiber 16 (through the system 100), receive light reflected from locations along a length of the sensing optical fiber 16 (also through the system 100), and analyze the reflected light (such as by OFDR) to determine a strain, temperature, or other physical information of the sensing optical fiber 16. For a shape sensing application, the interrogator 12 is configured to determine a three-dimensional position or shape of the sensing optical fiber 16. For clarity, the sensing optical fiber 16 will be referred to in the following discussion as the optical fiber 108. It will be understood that the optical fiber 108 may include the sensing optical fiber 16 or can optionally include a separate portion of fiber coupled to a proximal end of the sensing optical fiber 16. References below to the optical fiber 108 can include one or both of these cases.

The controller 10 can include a fiber connection 18, such as a multi-core fiber or a plurality of single-mode fibers, that can provide light as input to the system 100. The plurality of single-mode fibers can also be referred to as a bundle of single-mode fibers or a fiber bundle in this document, although the plurality of single-mode fibers may be bunched in a bundle, disposed in a linear array, and so forth. The system 100 can direct the light provided by the fiber connection 18 through various elements in the system 100 to couple into the sensing optical fiber 16. The light reflected from locations along the length of the sensing optical fiber 16 can return into the system 100, can propagate through the various elements in the system 100, can propagate through the fiber connection 18, and can be processed by the interrogator 12 in the controller 10. The system 100 can direct a portion of the light through various elements onto one or more detectors. The detector or detectors can generate one or more control signals. The system 100 can use the one or more control signals to control one or more actuatable elements in the system, to improve the coupling efficiency for light entering the optical fiber 108.

The controller 10 can include an electrical connection 20, which can provide electrical power to the system 100. A processor 114, which can be located in the controller 10 or located in the system 100, can receive the control signals from the one or more detectors in the system 100 and can drive the one or more actuatable elements in the system 100 to improve the coupling efficiency.

During operation, imaging optics in the system 100 can form an image 104 of an end 106 (also "end-face") of the optical fiber 108. An actuatable optical element 110, such as a pivotable mirror, can define an optical path 112 that extends to the actuatable optical element 110 and further extends to the end 106 of the optical fiber 108 when the optical fiber 108 is present. A processor 114 can determine a location in the image 104 of a specified feature, such as a circumferential edge of the end 106 of the optical fiber 108, in the image 104. Although the processor 114 is shown as being located with the system 100, it will be understood that the processor 114 can alternatively be located with the controller 10. The processor 114 can cause, based on the location of the specified feature in the image 104, the actuatable optical element 110 to actuate to align the optical path 112 to a core 116 of the optical fiber 108.

The optical path 112 is a geometrical construct that extends from optical element to optical element between the fiber connection 18 and the optical fiber 108. Specifically, one end of the optical path is located at the fiber connection 18, and the other end is located at the optical fiber 108 when the optical fiber 108 is present. The optical path 112 can be bent, translated, rotated, and otherwise aligned by the optical components during operation of the system 100. During operation of the system 100, a light beam 120 is directed to propagate along the optical path 112 from optical element to optical element, so that the light beam 120 follows the optical path 112. It is instructive to clarify that the optical path 112 can be redirected, both when the light beam 120 is present and when the light beam 120 is absent. For configurations in which the optical fiber 108 includes multiple cores, the system 100 can include multiple optical paths 112 that propagate toward respective cores of the optical fiber 108.

A light source 118 can direct the light beam 120 along the optical path 112 to couple into a core 116 of the optical fiber 108. In some examples, the controller 10 can include one or more light-producing elements, such as light-emitting diodes or laser diodes, and one or more light coupling elements, such as lenses, that can direct light from the light-producing elements into one or more cores of the one or more fibers in the fiber connection 18. In the configuration of FIG. 1, the light source 118 can include a distal end of the fiber connection 18 or a length of fiber that is coupled to a distal end of the fiber connection 18. For clarity, the fiber in the fiber connection 18 will be referred to in the following discussion as the source optical fiber 138 (herein also sometimes referred to as "capital-side optical fiber"). It will be understood that the source optical fiber 138 may be the same as the fiber connection 18 or can optionally include a separate portion of fiber coupled to a distal end of the fiber connection 18.

For examples in which the optical fiber 108 includes a single core 116, the source optical fiber 138 can include a single core 140. For examples in which the optical fiber 108 includes multiple cores 116, the source optical fiber 138 can also include multiple cores 140. The multiple cores 140 can be arranged in a pattern that resembles the pattern of the multiple cores of the optical fiber 108. As a specific example, the source optical fiber 138 and the optical fiber 108 can each include six cores located in a hexagonal pattern that surrounds the center of the circumferential edge of the fiber. During operation, the system 100 can simultaneously direct light from the multiple cores 140 of the source optical fiber 138 into the multiple cores of the optical fiber 108.

For examples in which the optical fiber 108 includes multiple cores 116, an alternative to receiving light from multiple cores of a multi-core fiber in the fiber connection 18 is receiving light from the cores of a plurality of single-core fibers, such as fibers in a fiber bundle or a linear array of fibers. In some examples, the optical fiber 108 can be a multi-core optical fiber. The core 116 of the optical fiber 108 can be a first core of a plurality of cores of the multi-core optical fiber. The optical path 112 can be a first optical path of a plurality of optical paths defined by the actuatable optical element 110. Each optical path of the plurality of optical paths can extend to the actuatable optical element 110 and can further extend to the end 106 of the multi-core optical fiber. The processor 114 can cause the actuatable optical element 110 to actuate to align the optical path 112 to the core 116 by causing the actuatable optical element 110 to actuate to simultaneously align the plurality of optical paths to the plurality of cores of the multi-core optical fiber. The light source 118 can be a first light source of a plurality of light sources. Each light source of the plurality of light sources can direct a corresponding light beam along a corresponding optical path of the plurality of optical paths to couple into a corresponding core of the plurality of cores of the multi-core optical fiber.

Figure 2:
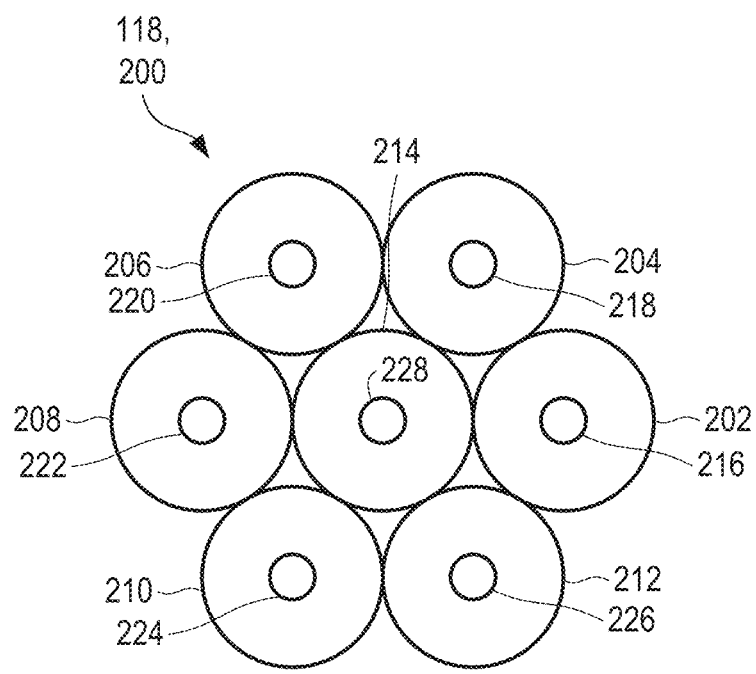
FIG. 2 shows an end-on view of an example of a light source configured as a fiber bundle, which is suitable for use in the system of FIG. 1.

FIG. 2 shows an end-on view of an example of a light source 118 configured as a fiber bundle 200, which is suitable for use in the system 100 of FIG. 1. The fiber bundle 200 includes a plurality of single-mode fibers 202, 204, 206, 208, 210, and 212. These single-mode fibers of the plurality include corresponding cores 216, 218, 220, 222, 224, and 226, respectively. The single-mode fibers of the plurality surround a central fiber 214 having a core 228. In this example, the single-mode fibers 202, 204, 206, 208, 210, and 212 of the plurality are arranged in a pattern of a regular hexagon surrounding the central fiber 214. The fiber bundle 200 is suitable for use as a light source 118 for an optical fiber 108 having multiple cores arranged in a similarly shaped hexagonal pattern. The fiber bundle 200 of FIG. 2 is but one example of a fiber bundle; other arrangements of fibers are also possible. The system 100 can further include magnification optics that can impart a magnification to the plurality of optical paths. The magnification can equal, or substantially equal to within a tolerance, such as 1%, 5%, 10%, or 20%, a ratio of a spacing between adjacent cores of the plurality of cores of the multi-core optical fiber to a spacing between adjacent cores of the plurality of single-core fibers. The magnification optics can include a source objective element 148 (described in detail below), which can collimate light emerging from the light source 118 to form the light beam 120, and an objective element 122 (also described in detail below), which can focus the light beam 120 to couple into the optical fiber 108. The ratio of the focal lengths of the source objective element 148 and the objective element 122 can be selected to equal, or substantially equal the ratio of the spacing between adjacent cores of the plurality of cores of the multi-core optical fiber of the optical fiber 108 to a spacing between adjacent cores of the plurality of single-core fibers of the light source 118.

Returning to FIG. 1, in some examples, the processor 114 can cause the actuatable optical element 110 to actuate to align the optical path 112 to the core 116 by using at least the following two operations. First, the processor 114 can determine an offset between the location of the specified feature in the image 104 and a predetermined target location in the image 104. Second, the processor 114 can cause the actuatable optical element 110 to actuate to reduce the offset. The processor 114 can optionally repeat these two operations during operation of the system 100 to help maintain a sufficiently high coupling efficiency into the core 116 during operation. For example, the processor 114 can determine a pixel location (e.g. a set of orthogonal location coordinates, such as x and y) in the image 104 of the specified feature (such as a center of a circumference of the optical fiber 108), can compare the determined pixel location to a specified pixel location (e.g., such as a set of values saved in a lookup table or other suitable memory) that corresponds to a well-aligned optical fiber 108, and cause the actuatable optical element 110 to actuate to move the determined pixel location to coincide with the specified pixel location.

In some examples, the specified feature can include part or all of a circumferential edge of the end 106 of the optical fiber 108. The core 116 can be located at a predetermined core location relative to the circumferential edge of the optical fiber 108. The processor 114 can cause the actuatable optical element 110 to actuate to align the optical path 112 to the core 116 by causing alignment of the optical path 112 to the predetermined core location. For example, for configurations in which the optical fiber 108 is a single-core fiber, the core 116 can be located at a center of the circumferential edge of the optical fiber 108. For configurations in which the optical fiber 108 is a multi-core fiber (e.g., a fiber in which a single cladding surrounds multiple cores that are spaced apart from one another), the cores 116 can be located at specified locations with respect to the circumferential edge of the optical fiber 108. For example, the optical fiber 108 can include four cores, with a center core located at a center of the circumferential edge and three cores located at corners of an equilateral triangle centered about the center core. As another example, the optical fiber 108 can include six cores located in a hexagonal pattern that surrounds the center of the circumferential edge of the optical fiber 108 (e.g., the cores can be located at the corners of a regular hexagon by being spaced apart azimuthally by sixty degrees, about sixty degrees, or sixty degrees to within a tolerance of one degree, two degrees, five degrees, or another suitable value). As yet another example, the optical fiber 108 can include seven cores, with a center core located at a center of the circumferential edge and six cores located at corners of a regular hexagon centered about the center core. Other suitable multi-core configurations can also be used.

For configurations in which the optical fiber 108 includes multiple cores, the circumference of the optical fiber 108 can include an optional azimuthal locating feature, such as a partially flattened edge, a notch, a protrusion, or other feature that can mechanically or optically indicate the azimuthal locations of the cores. For example, the optical fiber 108 can include a rod (not a core) that extends along a length of the optical fiber 108. Such rod can appear as a bright dot (e.g., brighter than an area surrounding the dot) or a dark dot (e.g., darker than an area surrounding the dot) in the image 104 of the end 106 of the optical fiber 108. In some examples, the azimuthal locating feature can be a mechanical feature of a connecting element. For example, the optical fiber 108 can be held in a ferrule and standard optical connector. When the connector is manufactured, a specific core of the optical fiber 108 can be illuminated, to align the specific core to a key of the standard optical connector.

Other specified features can also be used in addition to or instead of the circumferential edge of the end 106 of the optical fiber 108. For example, the feature can include the appearance of the core 116 of the optical fiber 108 in the image 104. In some illumination configurations, the core 116 can appear as a dark spot in the image 104, which can appear darker (e.g., with a lower intensity or brightness) than an area surrounding the core 116 (see, e.g., FIG. 13 below). In other illumination configurations, the core 116 can appear as a bright spot in the image 104, which can appear brighter (e.g., with a higher intensity or brightness) than an area surrounding the core 116. Identifying the core 116 directly from bright spots and/or dark spots in the image can also be used with multi-core fibers that have multiple cores.

The system 100 can optionally further include an illumination light source 130. The illumination light source 130 can illuminate the optical fiber 108 with illumination 132. The illumination 132 can have a wavelength different from a wavelength of the light beam 120. As a specific example, the wavelength of the light can be 1550 nm, and the wavelength of the illumination 132 can be in the visible spectrum, such as between 400 nm and 700 nm. Other wavelength values can also be used.

For configurations that include the illumination light source 130, at least some of the illumination 132 can reflect or scatter from the optical fiber 108 to form first light. In some examples, illumination 132 that reflects off the end 106 of the optical fiber 108 can produce the first light. In some examples, illumination that enters a side of the optical fiber 108 and exits the end 106 of the optical fiber 108 can form the first light.

Figure 3:
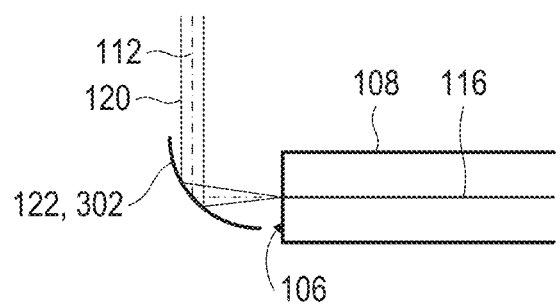
FIG. 3 shows a top view of an example of a portion of the system of FIG. 1, in which the objective element is configured as an objective mirror.
Figure 11:
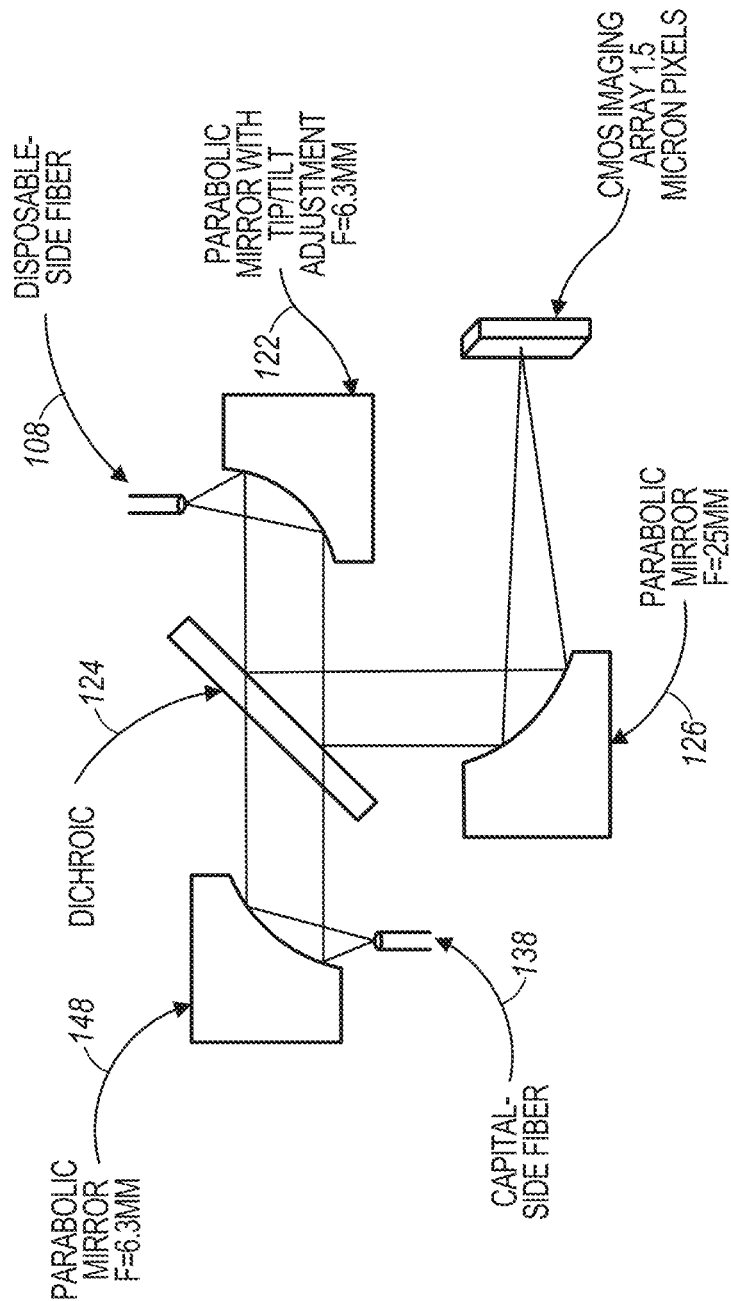
FIG. 11 is a simplified diagram showing selective components of the system of FIG. 1 to illustrate the use of parabolic mirrors in place of lenses.

An objective element 122 can collimate at least some of the first light to form second light. In some examples, such as the configuration of FIG. 1, the objective element 122 can include an objective lens. The optical path 112 can extend through the objective lens. As an alternative, the objective element 122 can include an objective mirror. FIG. 3 shows a top view of an example of a portion of the system 100 of FIG. 1, in which the objective element 122 is configured as an objective mirror 302. The objective mirror 302 can have a cross-section that includes a section of a parabola. Other configurations for the objective element 122 are also possible, including multiple mirrors, multiple lenses, or a combination of at least one mirror and at least one lens. Similarly, the focusing element 126 can include at least one of a focusing lens or a focusing mirror. FIG. 11 is a simplified diagram showing selective components of the system of FIG. 1, where the objective element 122, source objective element 148, and focusing element 126 are parabolic mirrors rather than lenses. Glass lenses generally have chromatic aberrations that change the location of the in-focus image depending upon wavelength. For that reason, either a specially designed achromatic lens or a parabolic mirror provides a better solution. Beneficially, parabolic mirrors are readily available.

Returning to FIG. 1, a dichroic mirror 124 can direct at least some of the second light away from the optical path 112 to form third light. For example, the dichroic mirror 124 can transmit light in a transmission band that includes 1550 nm. The dichroic mirror 124 can reflect light in a reflection band that includes the wavelength of the illumination 132, such as in the visible spectrum. This is but one numerical example; other wavelengths and wavelength ranges can also be used.

In the configuration of FIG. 1, the dichroic mirror 124 is a long pass dichroic mirror, which can transmit relatively long wavelengths (such as those used for performing the shape sensing, optionally in the infrared portion of the electromagnetic spectrum such as 1550 nm), and reflect relatively short wavelengths (such as those used for performing the imaging functions, optionally in the visible portion of the electromagnetic spectrum such as between 400 nm and 700 nm). Alternatively, the dichroic mirror 124 can be a short pass dichroic mirror, which can transmit the relatively short wavelengths (such as those used for performing the imaging functions) and reflect the relatively long wavelengths (such as those used for performing the shape sensing). Replacing the long pass filter with a short pass dichroic mirror would involve swapping the transmitted and reflected arms, so that the optical path 112 would reflect at the dichroic mirror 124 rather than transmit through the dichroic mirror 124 as currently shown in FIG. 1.

A focusing element 126 can focus the third light to form the image 104 at a focal plane of the focusing element 126.

An imaging array 128 can be located at the focal plane of the focusing element 126 and can sense the image 104. In some examples, the imaging optics can include the objective element 122, the dichroic mirror 124, the focusing element 126, and the imaging array 128. The processor 114 can receive from the imaging array 128 an analog and/or a digital signal that corresponds to the image 104. Other suitable configurations can also be used.

In the example of FIG. 1, the actuatable optical element 110 is configured as a pivotable mirror. The pivotable mirror can include a single mirror that can pivot in two dimensions, two separated mirrors that can each pivot in a single dimension, multiple mirrors that can each pivot in a single dimension or two dimensions, and other suitable configurations. In the configuration of FIG. 1, the pivotable mirror can include a reflective mirror that can pivot about a pivot point, and a linear actuator 136 that can pivot the reflective mirror about the pivot point. Although the pivotable mirror is shown in FIG. 1 as pivoting in only one dimension, it will be understood that the pivotable mirror can pivot in two orthogonal dimensions, using a pair of linear actuators 136. The processor 114 can control the linear actuators 136. The processor 114 can actuate the actuatable optical element 110 to align the optical path 112 to the core 116 of the optical fiber 108 by pivoting the pivotable mirror to steer the optical path 112 based on the location of the specified feature in the image 104.

The optical path 112 can include a fixed portion, extending between the light source 118 and the actuatable optical element 110. The optical path 112 can include a movable portion, extending between the actuatable optical element 110 and the end 106 of the optical fiber 108. During operation of the system 100, the movable portion of the optical path 112 can move in space, while the fixed portion of the optical path 112 may remain stationary. In the configuration of FIG. 1, the dichroic mirror 124, focusing element 126, and imaging array 128 are located in the fixed portion of the optical path 112. Other configurations can also be used.

In some examples, the actuatable optical element 110 can be located in the optical path 112 to be telecentric. For a telecentric configuration, pivoting the pivotable mirror can produce lateral translation of the optical path 112 at the end 106 of the optical fiber 108 without producing a change in angle of the optical path 112 at the end 106 of the optical fiber 108. In some examples, locating the pivotable mirror at a rear focal plane (or a back focal plane) of the objective element 122 can produce the telecentric condition.

The pivotable mirror of FIG. 1 is but one example of a suitable actuatable optical element 110. Other suitable configurations can include a translatable optical element, such as a translatable lens or a translatable mirror. In some examples, the translatable optical element can include the objective element 122, the full system 100, and/or the optical fiber 108.

In some examples, the system 100 can include features that allow the system 100 to operate in a separate environment, such as a clean-room environment in an industrial example, or a sterile environment in a medical example involving sterility. For example, in some applications in which a medical procedure is performed, such as when the system 100 can be reusable (e.g., can be capital equipment), and the optical fiber 108 can be replaceable (e.g. can be disposed of after a single-use, or reprocessed and disposed of after multiple uses, or be reprocessed for an indefinite number of uses), the system 100 can optionally include a barrier, such as a window or optical surface. In medical examples, the barrier may meet cleanliness requirements to help provide a clean environment for particular medical procedures not requiring sterility or may meet sterility requirements to help ensure sterility for medical procedures requiring sterility.

The window or optical surface can pass the light beam 120 to the optical fiber 108 and can receive light from the optical fiber 108, without contacting the optical fiber 108. In some examples, the window or optical surface, can be easily cleaned between uses of the system 100, to avoid contaminating optical fibers used in subsequent procedures. In some examples, the objective element 122, such as the objective lens, can form part of a barrier for the system 100. For example, the objective lens can be plano-convex, with the planar side optionally forming part of the sterile barrier. Other configurations can also be used. As noted above, in some examples, the barrier formed by the system 100 may not be a sterile barrier in that it does not meet sterility requirements.

The system 100 can optionally further include a field aligning lens 134 located in the optical path 112 proximate the end 106 of the optical fiber 108. Such a field aligning lens 134 can improve the coupling efficiency for cases when the optical fiber 108 is positioned away from a central axis of the optical elements of the system 100 (e.g., off-axis performance). The field aligning lens 134 can optionally have a same focal length as the objective element 122. The field aligning lens 134 can optionally have a diameter (e.g. a clear aperture) than is less than a diameter of the objective element 122. The field aligning lens 134 can optionally have a numerical aperture (e.g., half the diameter, divided by the focal length) than is less than a numerical aperture of the objective element 122. The field aligning lens 134 can optionally be formed as a plano-convex lens. The field aligning lens 134 can optionally have a planar side that forms part of a sterile barrier of the system 100. Because the field aligning lens 134 may be a relatively inexpensive item, the field aligning lens 134 can optionally be configured as a replaceable (e.g., single-use or multi-use) element that can be removed, reprocessed, reused, and/or disposed of. Such a replaceable element can optionally be packaged with, or separately from, the optical fiber 108.

In some examples, the system 100 can optionally monitor an amount of light that is reflected from one or more cores of the optical fiber 108. For example, in a position-sensing application, the system 100 can couple light into one or more cores of the optical fiber 108, light can reflect in varying amounts from locations along a length of the optical fiber 108, and the system 100 can analyze the reflected light, such as by optical frequency domain reflectometry (OFDR) performed by the interrogator 12, to determine a three-dimensional position of the optical fiber 108. In some examples, the analysis of the reflected light can include sensing a magnitude or amplitude of the reflected light. Such a sensed magnitude or amplitude can correspond to a coupling efficiency of light entering the optical fiber 108. The system 100 can actuate the actuatable optical element 110 to raise, maximize, and/or optimize the sensed magnitude or amplitude of the reflected light from the optical fiber 108.

In some examples, the system 100 can use the sensed magnitude or amplitude in concert with the imaging technique described above. For example, the system 100 can use the imaging technique to perform an initial positioning of the optical path 112 near or at the core 116 (e.g., as a coarse alignment procedure), and can use the sensed magnitude or amplitude to more precisely position the optical path 112 with respect to the core 116 (e.g., as a fine alignment procedure). In some examples, the system 100 can use the sensed magnitude or amplitude to position the optical path 112 with respect to the core 116, without using the imaging technique described above. In some examples, the system 100 can use the sensed magnitude or amplitude to register the camera image acquired by the imaging array 128 to the settings of the actuatable optical element 110 (e.g., implemented by a steering mirror). The steering mirror can be scanned, and the back-reflected light coupled into the capital-side fiber (corresponding to source optical fiber 138) can be plotted as a function of mirror position. Scanning the mirror can generate an image of the sensor end-face 106 similar to the image gathered (by the imaging array 128) using visible light and standard imaging. In this case, the cores are bright because of reflection from the gratings in the cores. Images such as this can take significant time to gather: a 1024×1024 pixel scan, for example, may take 26 minutes. This delay may be far too long to use in a surgical setting. It can be used, however, to register the camera image of the sensor end-face 106 to the steering mirror settings. This calibration then allows the mirror settings to be determined by the location of the cores in the visible-light image.

As explained above, the system 100 can illuminate the optical fiber 108 to capture the image 104 of the end 106 of the optical fiber 108. For configurations in which the light source 118 includes a source optical fiber 138, the system 100 can optionally illuminate an end of the source optical fiber 138 and include additional optical elements to superimpose a view of an end 142 of the source optical fiber 138 onto the view of the end 106 of the optical fiber 108 in the image 104. Allowing the ends of the two fibers to be viewed simultaneously can provide additional information during the assembly and alignment stages of the system 100.

As explained above, a first illumination light source, such as 130, can illuminate the optical fiber 108 with first illumination, such as 132. The first illumination 132 can have a first wavelength different from a wavelength of the light beam 120. At least some of the first illumination 132 can reflect or scatter from the optical fiber 108 to form first light. An objective element 122, such as an objective lens or objective mirror, can collimate at least some of the first light to form second light. A second illumination light source 144 can illuminate the source optical fiber 138 with second illumination 146. The second illumination 146 can have a second wavelength that is different from the first wavelength and different from the wavelength of the light beam 120. At least some of the second illumination 146 can reflect or scatter from the source optical fiber 138 to form third light. A source objective element 148, such as a source objective lens or source objective mirror, can collimate at least some of the third light to form fourth light. A dichroic mirror, such as 124, and a reflector 150, such as a retroreflector or retroreflecting prism, can superimpose the second light and the fourth light to form fifth light. In the configuration shown in FIG. 1, the dichroic mirror 124 can reflect at least some of the fourth light toward the reflector 150. Alternatively, the dichroic mirror 124 can be oriented to reflect at least some of the second light toward the reflector 150. A focusing element, such as 126, can focus the fifth light to form the image 104 at a focal plane of the focusing element 126. An imaging array, such as 128, located at the focal plane of the focusing element 126, can sense the image 104. Because the ends 106, 142 of the fibers can be imaged with light at different wavelengths, the processor 114 can optionally separate the information from the two superimposed views as needed. Forming the superimposed views of the ends 106, 142 of the fibers can provide additional information during the assembly and/or alignment stages of the system 100, and/or during use of the system 100. For example, because the ends of the fiber can be visible in the image 104, the image 104 can be used to check the fiber ends for contamination or damage.

Figure 12:
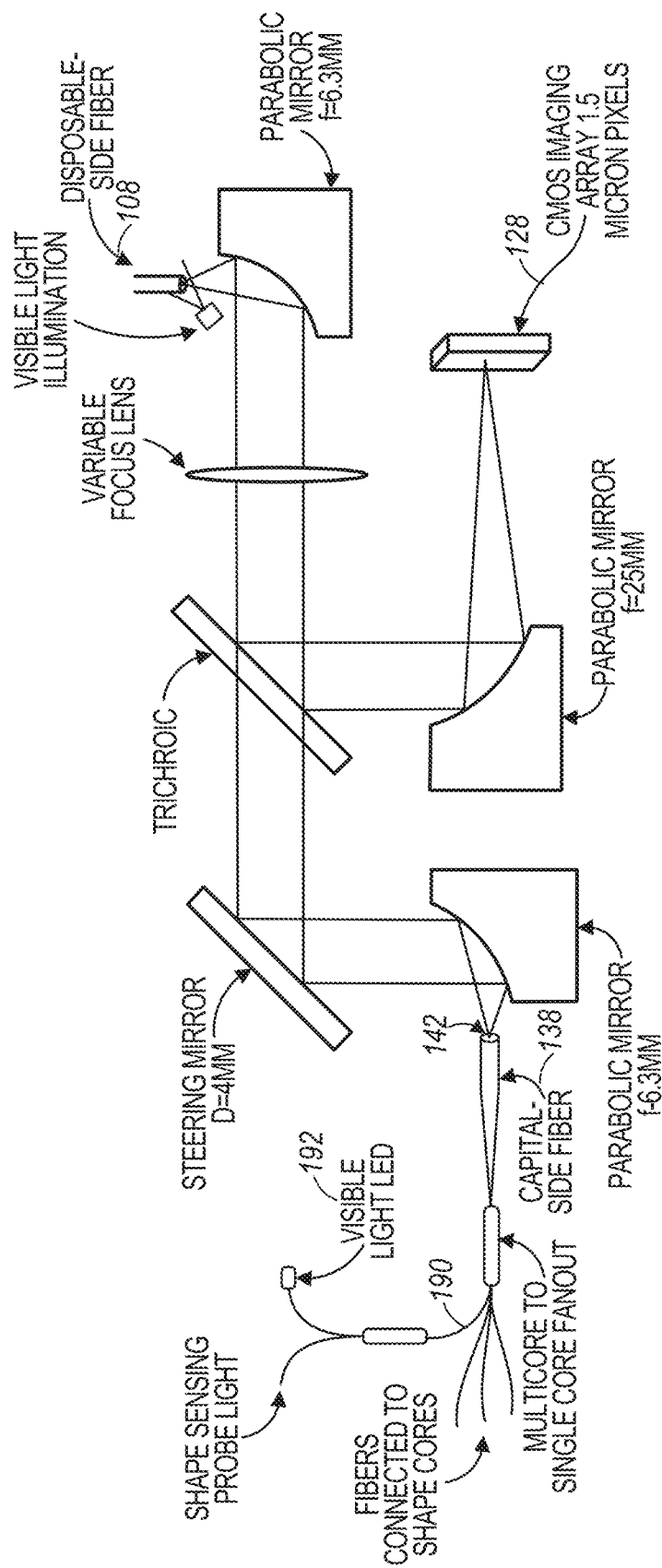
FIG. 12 shows a schematic diagram of an example system that allows imaging of both the capital-side optical fiber and the multi-core sensor.
Figure 13:
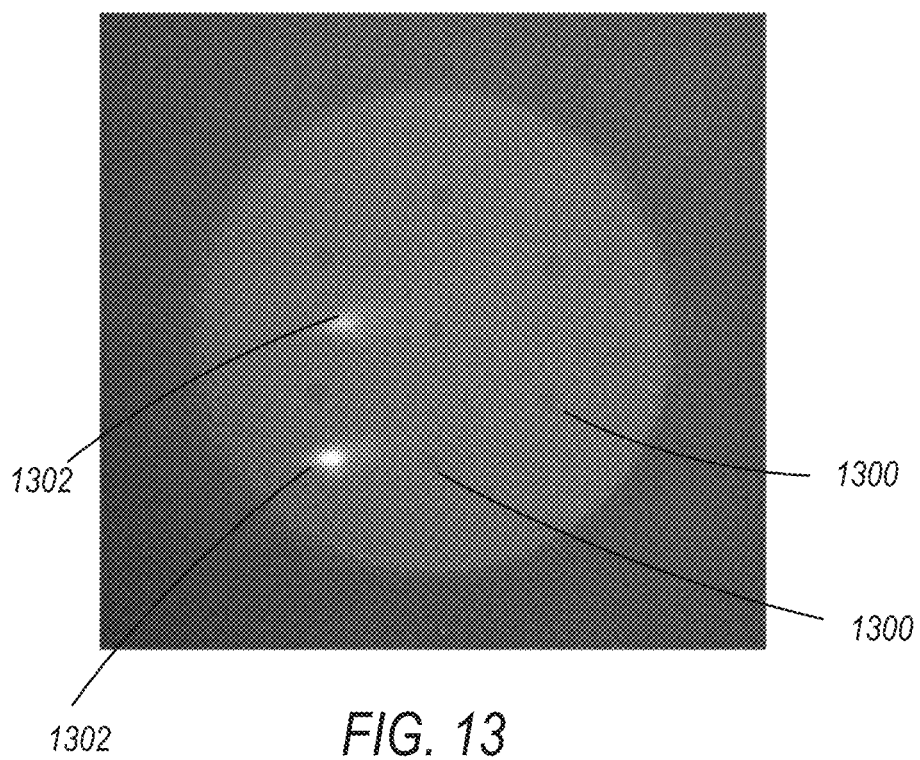
FIG. 13 shows an example image generated by the system of FIG. 12.

As an alternative to illuminating the end 142 of the source optical fiber 138, or in addition to performing such illumination, the controller 10 can inject illumination into an opposite end of the source optical fiber 138, which can propagate along the source optical fiber 138 to emerge from the end 142 of the source optical fiber 138. Because the illumination for imaging can use a different wavelength than the light used for shape sensing, the injection of the illumination can be performed by wavelength division multiplexing at the controller 10. FIG. 12 shows a schematic diagram of an example system (corresponding to a particular embodiment of system 100) that allows imaging of both the capital-side (or source) optical fiber 138 and the multi-core sensor (corresponding to optical fiber 108), and thus determining the relative position of the images. Rapid and continuous measurement of the position of the image of the capital-side cores with respect to the cores of the sensor can be achieved by injecting visible light into one or more of the capital-side cores. Various existing fibers include an extra core (beyond the cores used for shape sensing) that may be used for this purpose. Alternatively, one of the cores used for shape sensing (e.g., core 190 in FIG. 12) may be used by injecting visible light (e.g., from a visible light LED 192) using a wavelength division multiplexer. The reflection of the capital-side light off of the sensor fiber interface can then be imaged. The image generated by this type of system is shown in FIG. 13. The sensor cores 1300 (only two labeled) appear dark, and the image of the two illuminated capital-side cores 1302 are bright. With the image of the sensing fiber and the image of at least one of the cores of the capital-side fiber in the same image, it is straightforward to steer the mirror (or other actuatable optical element 110) such that the core images are superimposed and good coupling is achieved.

With renewed reference to FIG. 1, the optical path 112 can include an optional first pivotable element 152 that can redirect the optical path 112 within an angular range that extends in one dimension or in two dimensions. The first pivotable element 152 can include a mirror on adjustable mount that can controllably pivot about one, two, three, or more axes. Where the pivotable element be pivoted about multiple axes, the axes may intersect or not intersect, or be orthogonal to each other or be rotationally offset by some other angle. The phrase "pivotable element" is intended to include a variety of "tip/tilt elements" that can include, for example, elements such as mirrors, mounted on a tip/tilt stage. A tip/tilt stage can typically pivot about each of two orthogonal and intersecting axes, although other configurations can also be used. In the configuration of FIG. 1, the first pivotable element 152 can have a nominal angle of incidence of 45 degrees, or about 45 degrees, so that the optical path 112 can be nominally redirected by 90 degrees, or about 90 degrees. The incidence angle of 45 degrees is but one example of an incident angle; other suitable angles of incidence can also be used. The first pivotable element 152 can provide an additional degree of freedom during the assembly and alignment stages of the system 100. For example, locating the first pivotable element 152 in the optical path 112 can help relax some placement tolerances on the source optical fiber 138, and can help compensate for rotations and/or displacements of other optical elements in the optical path 112. The first pivotable element 152 can be located in the optical path 112 between the light source 118 and the dichroic mirror 124, between the dichroic mirror 124 and the actuatable optical element 110, between the actuatable optical element 110 and the optical fiber 108, or at any other suitable location along the optical path 112.

The optical path 112 can include an optional second pivotable element 154 that can redirect the optical path 112 within an angular range that extends in one dimension or in two dimensions. The second pivotable element 154 can be similar in structure and function to the first pivotable element 152. The second pivotable element 154 can be located in the optical path 112 between the light source 118 and the dichroic mirror 124, between the dichroic mirror 124 and the actuatable optical element 110, between the actuatable optical element 110 and the optical fiber 108, or at any other suitable location along the optical path 112. The first pivotable element 152 and the second pivotable element 154 can be located at different locations along the optical path 112 (e.g., can be longitudinally separated along the optical path 112). Although the second pivotable element 154 is shown in FIG. 1 as being adjacent to the first pivotable element 152 with no intervening optical elements between them, the second pivotable element 154 can be located at any suitable location along the optical path 112, including between beamsplitters, or between a beamsplitter and the actuatable optical element 110. Using two pivotable elements that are separated along the optical path 112 can be helpful during the assembly and alignment of the optical components in the system 100. For example, using two longitudinally separated pivotable elements can allow the optical path 112 to be laterally translated (e.g., moved without rotation) to a desired location, or rotated in two dimensions while keeping a fixed spatial location. As a specific example, using two pivotable elements can allow the optical path 112 to pass through a center of a lens, rather than the edge of a lens, to improve the optical performance of the lens.

Figure 14:
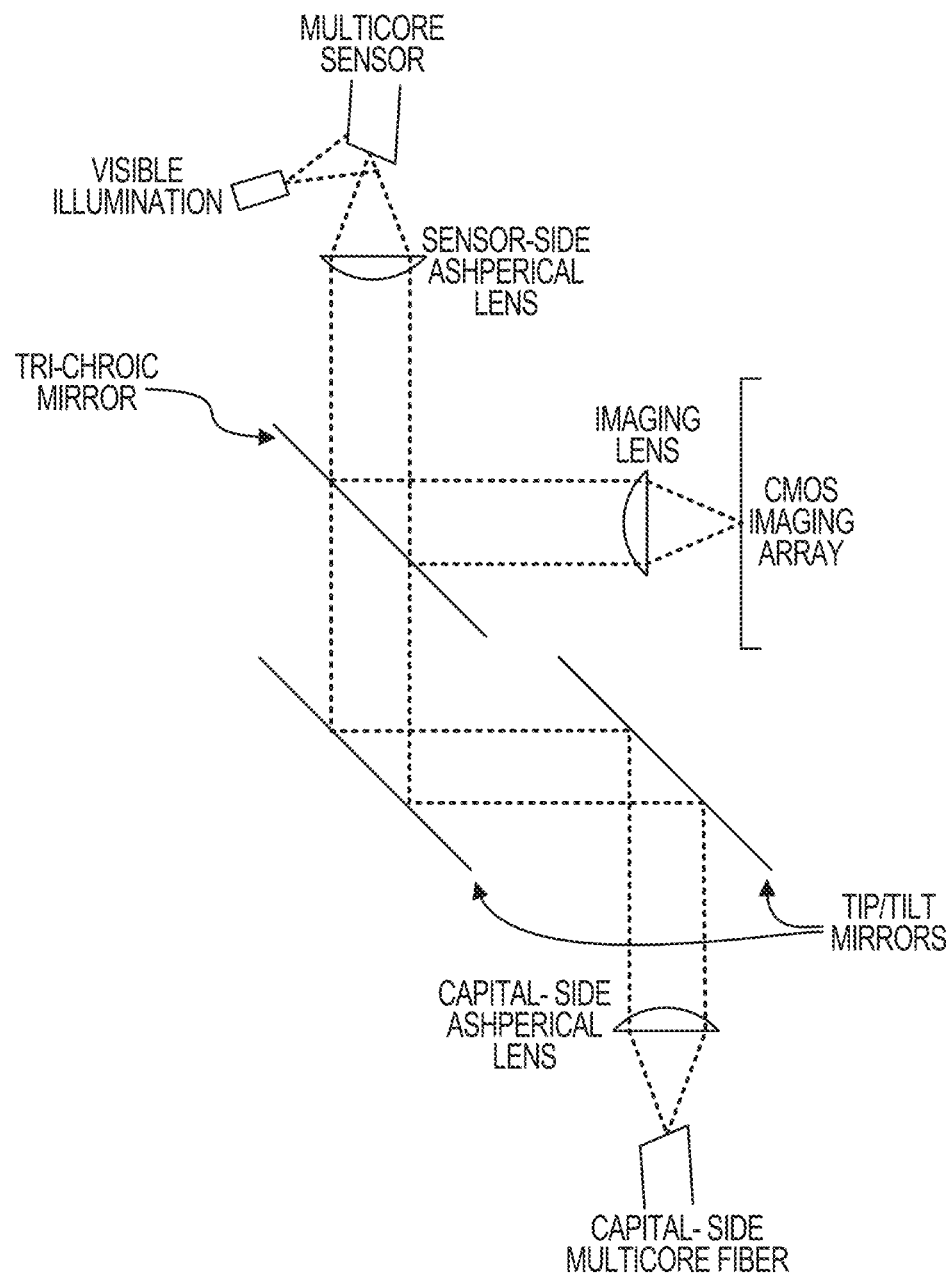
FIG. 14 shows a schematic diagram of an example system for making a non-contact connection between a capital-side fiber and a multi-core sensor that uses two tip/tilt mirrors for beam steering and alignment.

FIG. 14 shows a schematic diagram of an example system (corresponding to a particular embodiment of the system 100) for making a non-contact connection between a capital-side fiber (serving as the light source 118) and a multi-core sensor (corresponding to optical fiber 108) that uses two tip/tilt mirrors (e.g., implementing pivotable elements 152, 154) for beam steering and alignment. If a tip/tilt mirror is used to steer the beam to compensate for connector x/y misalignments of more than 1-200 microns, significant distortions can occur because the light passes through the side of the lens (or other objective element 122) rather than the center. This leads to relatively large losses for larger sensor displacements. To compensate for this, two tip/tilt mirrors (152, 154) can be used to steer the beam. In this configuration, the beam can be steered to be at the right angle to the lens (or other objective element 122) to enable coupling to an offset sensor (corresponding to optical fiber 108) while still passing through the center of the lens.

Figure 15:
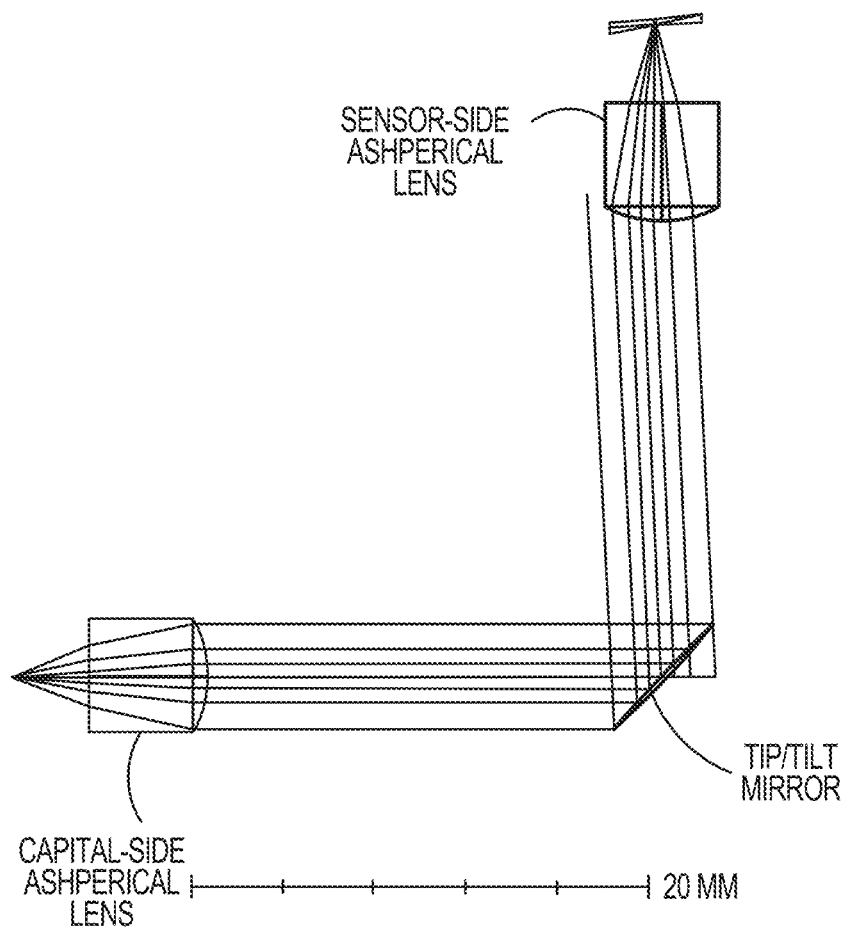
FIGS. 15 and 16 show a simple model of a system with one and two tip/tilt mirrors, respectively.
Figure 16:
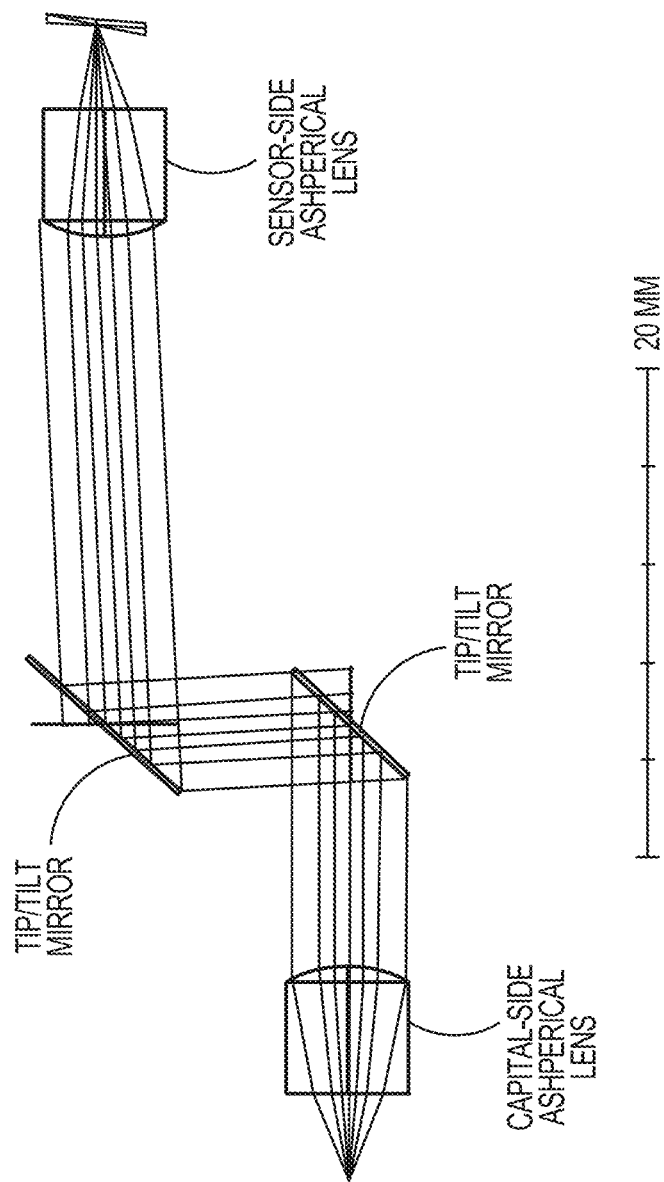

FIGS. 15 and 16 show a simple model of a system with one and two mirrors, respectively. Both systems are set up to focus light on a fiber displaced by 300 microns from the optimal optical axis of the system, which is centered on the lens (or other objective element 122). In the first model (FIG. 15), with one mirror (e.g., implementing pivotable element 152), one can see that the beam is well off-center of the lens. In this model, coupling losses were about 1.96 dB one way. In the second model (FIG. 16), the two mirrors (e.g., implementing pivotable elements 152, 154) are used to steer the beam to be more centered on the lens while still coupling to the offset fiber core. This reduces the one-way loss to 0.92 dB, which is a significant improvement.

In some examples, it may be beneficial to use one or more pivotable elements to steer the optical path 112 such that the optical fiber 108 and the source optical fiber 138 can be approximately parallel to each other (at least to within a few degrees). Orienting the fibers to be approximately parallel is generally consistent with use of typical physical contact connectors, which typically require insertion of the fibers from opposing sides. The configuration of FIG. 1 can be modified to achieve this parallelism condition by removing one of the pivotable elements 152 or 154, adding an additional pivotable element, modifying the dichroic mirror 124 to be a short pass filter rather than a long pass filter, and other geometrical modifications.

Thus far, discussion has focused on laterally aligning the optical path 112 to a core 116 of the optical fiber 108. Specifically, for a coordinate system (x, y, z) at the end 106 of the optical fiber 108, in which z corresponds to a central axis of the optical path 112, the discussion above is directed to aligning the optical path 112 in the x- and y-dimensions. For example, capturing an image 104 of the end 106 of the optical fiber 108 can provide x- and y-coordinates of one or more features on the optical fiber 108, and the system 100 can actively align the optical path 112 in x- and y-dimensions with respect to the feature or features in the image 104.

In some applications, active alignment in x- and y-dimensions may be sufficient to achieve sufficiently high coupling into the optical fiber 108. These applications can rely on mechanical placement of the end 106 of the optical fiber 108 as being sufficiently accurate to achieve the sufficiently high coupling. For example, the optical fiber 108 may fit into a clamp that can position the end 106 of the optical fiber 108 in a specified plane (in the z-direction) to within a specified tolerance, such that for any z-position within the tolerance, the coupling efficiency is sufficiently high.

In other applications, the mechanical placement in the z-direction may not be suitably accurate to achieve the sufficiently high coupling. For these applications, the system 100 can further include one or more longitudinal position sensor elements. The longitudinal position sensor elements can detect a longitudinal separation (e.g., a distance as measured along the optical path 112) between a focus of the light beam 120 and the end 106 of the optical fiber 108. The longitudinal position sensor elements can be located at any suitable location in the fixed portion of the optical path 112.

Similarly, the system 100 can further include one or more longitudinal position adjustor elements. The longitudinal position adjustor element or elements can longitudinally position the focus of the light beam 120 to reduce the longitudinal separation between the focus and the 106 of the optical fiber 108. The longitudinal position adjustor element or elements can be located at any suitable location in the fixed portion of the optical path 112. In some examples, the longitudinal position adjustor element or elements can be located in the optical path 112 between the longitudinal position sensor elements and the optical fiber 108.

In the configuration of FIG. 1, the longitudinal position sensor elements can include a beamsplitter 156, such as a dichroic beamsplitter, a 50-50 beamsplitter, or another suitable beam-splitting element. In the configuration of FIG. 1, the beamsplitter 156 can be located between the dichroic mirror 124 and the optical fiber 108 along the optical path 112. Alternatively, the dichroic mirror 124 can be located between the beamsplitter 156 and the optical fiber 108 along the optical path 112. Other configurations can also be used, including configurations that can swap the functions of the transmitted and reflected paths through the beamsplitter 156.

The beamsplitter 156 can receive light that has been reflected and/or scattered from the end 106 of the optical fiber 108. The beamsplitter 156 can direct a portion of the reflected light toward a bi-prism 158, a lens 160, and a sensor 162. The lens 160 can focus the light emergent from the bi-prism 158 to form an image 164 at the sensor 162. The sensor 162 can be coupled to the processor 114.

The bi-prism 158 can impart a wedge angle between opposing halves of the reflected light such that the specified feature, such as the circumferential edge of the optical fiber 108) in the image 164 has a corresponding duplicate feature in the image 164. The processor 114 can further determine, based at least in part on a spacing between the specified feature and the corresponding duplicate feature, the longitudinal separation between the focus and the end 106 of the optical fiber 108. For these configurations, the spacing can be considered to be a focus error signal. The spacing can be compared against a specified distance, which can be determined in an initial configuration of the system 100, such as at a factory during initial assembly and alignment of the system 100. If the spacing is less than the specified distance, the focus can be on one side of the end 106 of the optical fiber 108, such as outside the optical fiber 108. If the spacing is greater than the specified distance, the focus can be on the other side of the end 106 of the optical fiber 108, such as within the optical fiber 108.

The bi-prism configuration of FIG. 1 is but one example of a configuration for the longitudinal position sensor elements. Other suitable configurations are shown in FIGS. 4-6 and described below.

Figure 4:
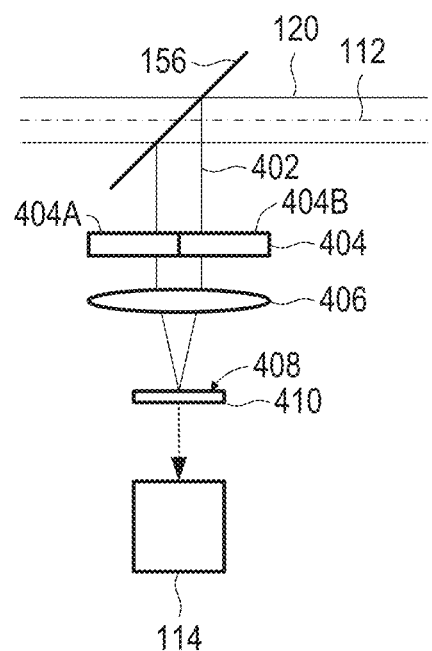
FIG. 4 shows a top view of an example of longitudinal position sensor elements that are suitable for use in the system of FIG. 1.

FIG. 4 shows a top view of an example of longitudinal position sensor elements that are suitable for use in the system 100 of FIG. 1. The beamsplitter 156 in the optical path 112 directs a light portion 402 of the light beam 120 that has been reflected and/or scattered from the end 106 (FIG. 1) of the optical fiber 108 (FIG. 1) toward a split-field dichroic filter 404, a lens 406, and a sensor 410. A first half 404A of the split-field dichroic filter 404 can have a first spectral profile (e.g., can pass a first wavelength or a first wavelength band). A second half 404B of the split-field dichroic filter 404 can have a second spectral profile different from the first spectral profile (e.g., can pass a second wavelength different from the first wavelength or a second wavelength band different from the first wavelength band). The light portion 402 can form an image 408 at the sensor 410. The sensor 410 can be coupled to the processor 114.

The light portion 402 can have a plurality of wavelengths. The split-field dichroic filter 404 can be configured such that a specified feature in the image 408 has a corresponding duplicate feature in the image 408 at a different wavelength. The processor 114 can further determine, based at least in part on a spacing between the specified feature and the corresponding duplicate feature, the longitudinal separation between the focus and the end 106 of the optical fiber 108. The spacing can be compared against a specified distance, as explained above.

Figure 5:
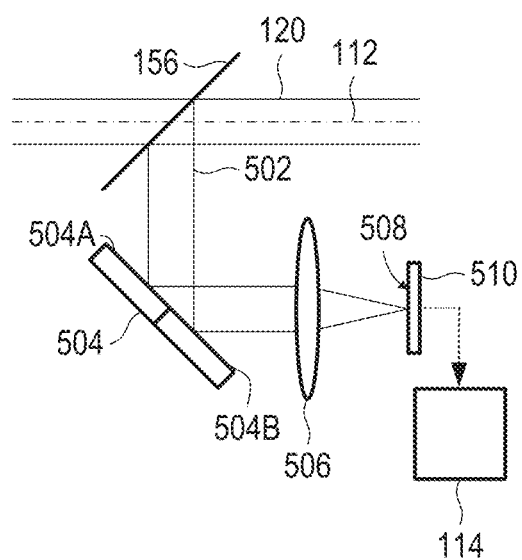
FIG. 5 shows a top view of another example of longitudinal position sensor elements that are suitable for use in the system of FIG. 1.
Figure 6:
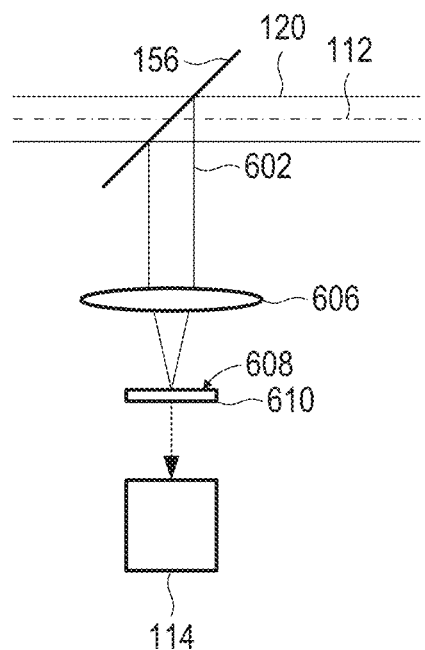
FIG. 6 shows a top view of another example of longitudinal position sensor elements that are suitable for use in the system of FIG. 1.

FIG. 5 shows a top view of another example of longitudinal position sensor elements that are suitable for use in the system 100 of FIG. 1. The beamsplitter 156 in the optical path 112 directs a light portion 502 of light beam 120 that has been reflected and/or scattered from the end 106 (FIG. 1) of the optical fiber 108 (FIG. 1) toward a liquid crystal on silicon (LCOS) device 504 that has a programmable aperture, a lens 506, and a sensor 510. The light portion 502 can form an image 508 at the sensor 510. The sensor 510 can be coupled to the processor 114.

The LCOS device 504 can use time multiplexing to achieve a similar splitting effect achieved by the elements shown in FIGS. 1 and 4. At a first time, a first half 504A of the aperture of the LCOS device 504 can be reflective, while a second half 504B of the aperture of the LCOS device 504 can be non-reflective. During the first time, the processor 114 can acquire a first image from the sensor 510. At a second time after the first time, the first half 504A of the aperture of the LCOS device 504 can be non-reflective, while the second half 504B of the aperture of the LCOS device 504 can be reflective. During the second time, the processor 114 can acquire a second image from the sensor 510. The LCOS device 504 can be configured such that a specified feature in the first image has a corresponding duplicate feature in the second image. The processor 114 can further determine, based at least in part on a spacing between the specified feature and the corresponding duplicate feature, the longitudinal separation between the focus and the end 106 of the optical fiber 108. The spacing can be compared against a specified distance, as explained above.

FIG. 6 shows a top view of another example of longitudinal position sensor elements that are suitable for use in the system 100 of FIG. 1. The beamsplitter 156 in the optical path 112 directs a light portion 602 of light beam 120 that has been reflected and/or scattered from the end 106 (FIG. 1) of the optical fiber 108 (FIG. 1) toward a chromatically aberrated lens 606 and a sensor 610. The light portion 602 can form an image 608 at the sensor 610. The sensor 610 can be coupled to the processor 114.

The light portion 602 can have a plurality of wavelengths. Because the chromatically aberrated lens 606 includes chromatic aberration, the chromatically aberrated lens 606 can bring light at one wavelength to a first focus at a first focal plane, and can bring light at a second wavelength (the second wavelength different from the first wavelength) to a second focus at a second focal plane that is separated from the first focal plane. Note that in the absence of chromatic aberration, which is typically the case with most well-designed lenses that operate at more than one wavelength, the first and second focal plane are often coincident or are nearly coincident.

The chromatically aberrated lens 606 can be configured such that a specified feature in the image 608 has a corresponding duplicate feature in the image 608 at a different wavelength. The processor 114 can further determine, at least in part from a size of the specified feature in the image 608 and a size of the corresponding duplicate feature in the image 608, the longitudinal separation between the focus and the end 106 of the optical fiber 108. In addition, or as an alternative, the processor 114 can process the image 608, such as by perform a two-dimensional Fast Fourier Transform on the image 608, to evaluate the sharpness of the image 608 at different wavelengths. The sharpness at the different wavelengths can help determine the longitudinal separation between the focus and the end 106 of the optical fiber 108, and/or can help determine at least a sign of the longitudinal separation (e.g. positive or negative).

The configuration of FIG. 1 uses distinct beamsplitters (such as dichroic mirror 124 and beamsplitter 156), distinct focusing elements (such as focusing element 126 and lens 160), and distinct sensors (such as imaging array 128 and sensor 162) to perform the tasks of imaging (such as using dichroic mirror 124, focusing element 126, imaging array 128) and of focus sensing (such as using beamsplitter 156, lens 160, and sensor 162). As an alternative, the tasks and elements can be combined, such as by using a single beamsplitter (such as dichroic mirror 124) and moving the longitudinal position sensing elements (such as the bi-prism of FIG. 1, the split-field dichroic filter of FIG. 4, the LCOS device of FIG. 5, or the chromatically aberrated lens of FIG. 6) to be located between the focusing element 126 and the imaging array 128. Such an alternative can be especially effective if the end 106 of the optical fiber 108 is illuminated with multiple wavelengths, such as three wavelengths that can all be located in a reflection band of the dichroic mirror 124 (or a transmission band if the long pass filter of FIG. 1 is replaced with a short pass filter).

Figure 7:
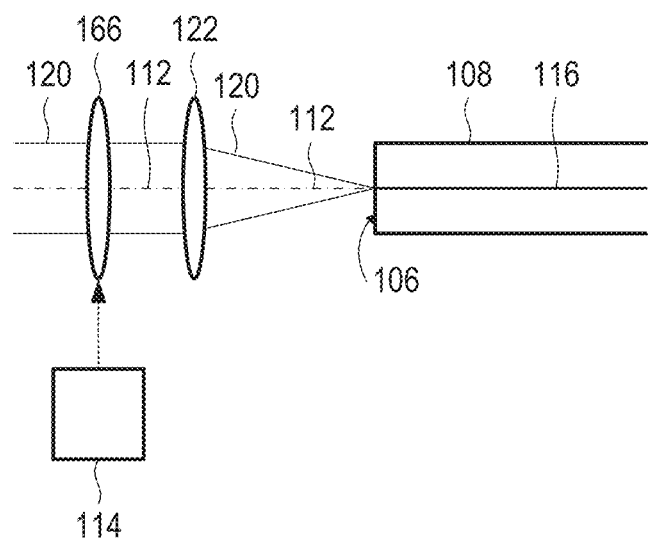
FIG. 7 shows a top view of the longitudinal position adjustor elements in the system of FIG. 1.

FIG. 7 shows a top view of the longitudinal position adjustor elements in the system 100 of FIG. 1. In FIGS. 1 and 7, the longitudinal position adjustor element can include a variable focus lens 166. The variable focus lens 166 can be disposed in the optical path 112, such as in the fixed portion of the optical path 112. The processor 114 can further cause the variable focus lens 166 to adjust, based on the longitudinal separation (determined by the longitudinal position sensor elements) between the focus and the end 106 of the optical fiber 108, a collimation of the light beam 120 to position the focus at the end 106 of the optical fiber 108.

Figure 8:
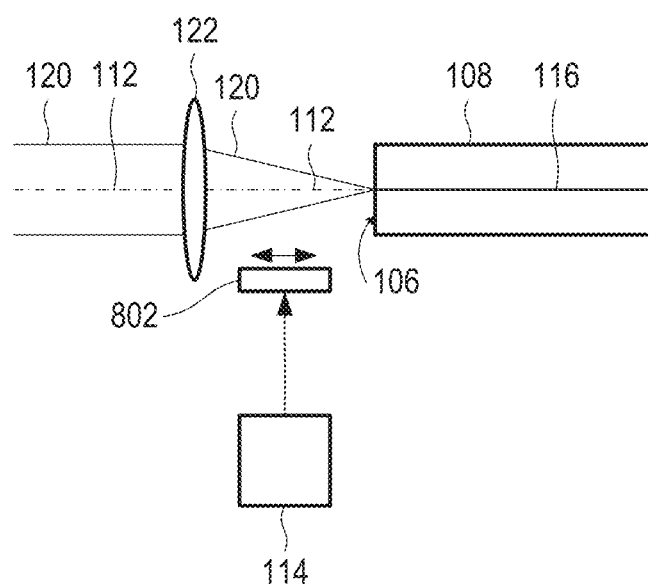
FIG. 8 shows a top view of an example of longitudinal position adjustor elements suitable for use in the system of FIG. 1.

FIG. 8 shows a top view of an example of longitudinal position adjustor elements suitable for use in the system 100 of FIG. 1. As an alternative to using the variable focus lens 166 of FIGS. 1 and 7, the system 100 can include a linear actuator 802 to longitudinally position the objective element 122 with respect to the end 106 of the optical fiber 108, to longitudinally position the entire system 100 with respect to the end 106 of the optical fiber 108, to longitudinally position the optical fiber 108 with respect to the system 100, or to otherwise controllably vary the separation between the system 100 and the end 106 of the optical fiber 108. The processor 114 can control the linear actuator 802, based on the longitudinal separation determined by the longitudinal position sensor elements. The linear actuator 802 can adjust a spacing between the focus and the end 106 of the optical fiber 108. Other suitable actuators and actuator types can also be used.

Any or all of the longitudinal position sensor techniques (such as those that use the bi-prism of FIG. 1, the split-field dichroic filter of FIG. 4, the LCOS device of FIG. 5, the chromatically aberrated lens of FIG. 6, or others) can be used with any or all of the longitudinal position adjustor techniques (such as that use the variable focus lens of FIGS. 1 and 7, the linear actuator of FIG. 8, or others). Further, any or all of the longitudinal position sensor techniques and any or all of the longitudinal position adjustor techniques can be used with any or all of the configurations for the objective element (such as an objective lens or an objective mirror), any or all of the configurations for the optical fiber (such as single-core or multiple-core), any or all of the configurations for the light source (such as a single-core optical fiber, a multi-core optical fiber, a plurality of single-core fibers, or others), and any or all configurations of the pivotable elements (such as including two, omitting one and including just one, omitting both and not including any, or including more than two).

Figure 9:
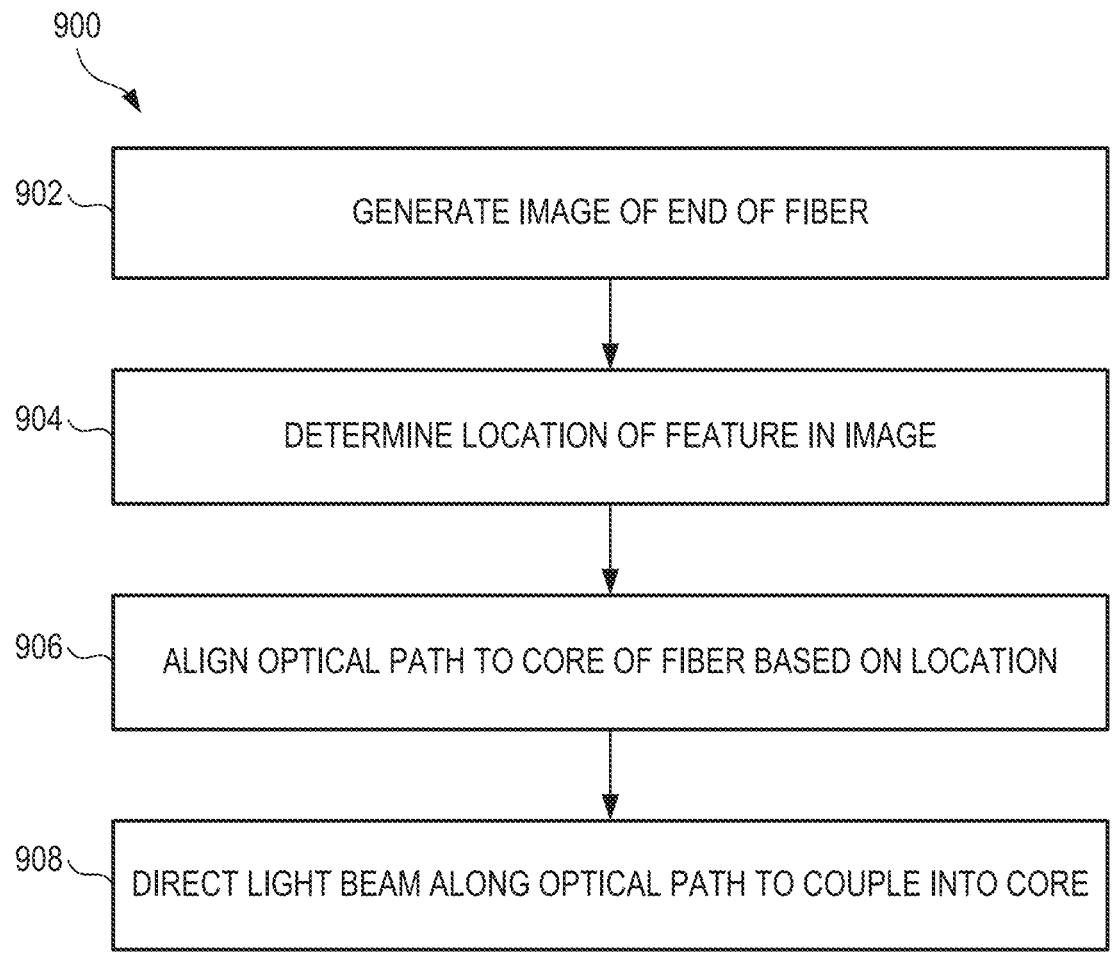
FIG. 9 shows a flowchart of an example of a method for operating a system to direct light into an optical fiber.

FIG. 9 shows a flowchart of an example of a method 900 for operating a system to direct light into an optical fiber. The system can include imaging optics, a processor, and an actuatable optical element. The actuatable optical element can define an optical path. The optical path can extend to the actuatable optical element and can further extend to the end of the optical fiber. The method 900 can be executed on the system 100 of FIG. 1, or on any other suitable system.

At operation 902, the system can generate, with the imaging optics, an image of an end of the optical fiber.

At operation 904, the system can determine, with the processor, a location in the image of a specified feature in the image.

At operation 906, the system can cause, with the processor, the actuatable optical element to actuate to align the optical path to a core of the optical fiber based on the location of the specified feature in the image.

At operation 908, the system can direct a light beam along the optical path to couple into the core of the optical fiber.

In some examples, the method 900 can optionally further include determining, with the processor, an offset between the location of the specified feature in the image and a predetermined target location in the image. The method 900 can optionally further include causing, with the processor, the actuatable optical element to actuate to reduce the offset.

In some examples, the specified feature can be a circumferential edge of the end of the optical fiber. The core can be located at a predetermined core location relative to the circumferential edge of the optical fiber. The method 900 can optionally further include causing, with the processor, the actuatable optical element to actuate to align the optical path to the core by causing alignment of the optical path to the predetermined core location.

In some examples, the method 900 can optionally further include illuminating the optical fiber with illumination that has a wavelength different from a wavelength of the light beam.

In some examples, the method 900 can optionally further include reflecting or scattering at least some of the illumination from the optical fiber to form first light. The method 900 can optionally further include collimating, with an objective element of the imaging optics, at least some of the first light to form second light. The method 900 can optionally further include directing, with a dichroic mirror of the imaging optics, at least some of the second light away from the optical path to form third light. The method 900 can optionally further include focusing, with a focusing element of the imaging optics, the third light to form the image at a focal plane of the focusing element. The method 900 can optionally further include sensing, with an imaging array located at the focal plane of the focusing element, the image.

In some examples, the method 900 can optionally further include detecting, by a longitudinal position sensor, a longitudinal separation between a focus and the end of the optical fiber. The method 900 can optionally further include positioning, with a longitudinal position adjustor, the focus to reduce the longitudinal separation.

In some examples, the longitudinal position adjustor can further create a duplicate feature in the image. The method 900 can optionally further include determining, by the processor and based at least in part on a spacing or a size difference between the specified feature and the corresponding duplicate feature, the longitudinal separation between the focus and the end of the optical fiber.

In some examples, the longitudinal position adjustor can include a variable focus lens disposed in the optical path. The method 900 can optionally further include causing, by the processor and based on the longitudinal separation between the focus and the end of the optical fiber, the variable focus lens to adjust a collimation of the light beam to position the focus at the end of the optical fiber.

In some examples, the longitudinal position adjustor can include an actuatable objective lens that can direct the optical path onto the end of the optical fiber. The method 900 can optionally further include causing, by the processor and based on the longitudinal separation between the focus and the end of the optical fiber, the actuatable objective lens to move to position the focus at the end of the optical fiber.

Figure 10:
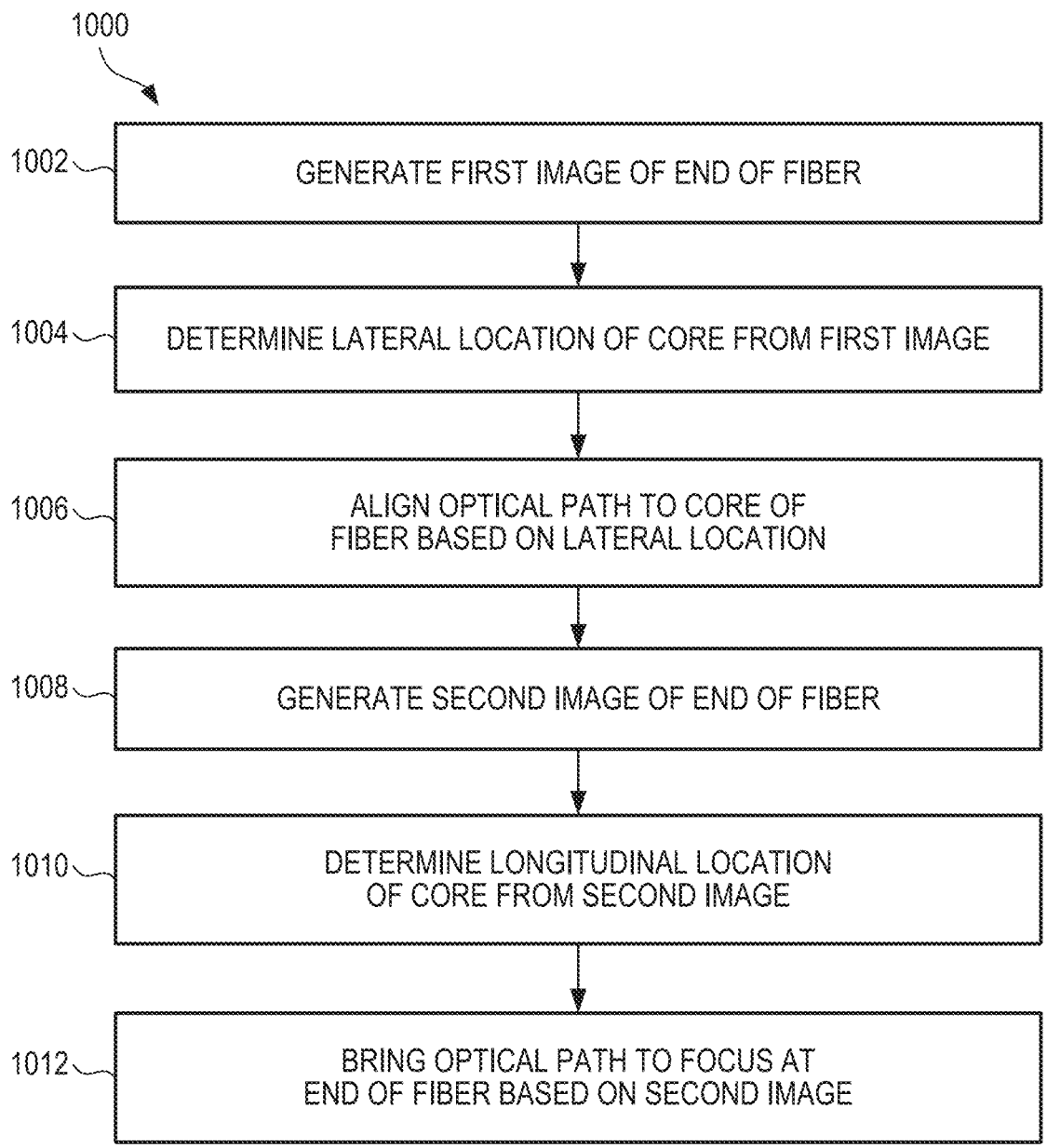
FIG. 10 shows a flowchart of an example of another method for operating a system to direct light into an optical fiber.

FIG. 10 shows a flowchart of an example of another method 1000 for operating a system to direct light into an optical fiber. The optical fiber can include a core. The system can include imaging optics, a first actuatable optical element, and a second actuatable optical element. The method 1000 can be executed on the system 100 of FIG. 1, or on any other suitable system.

At operation 1002, the system can generate, with the imaging optics, a first image of an end of the optical fiber.

At operation 1004, the system can determine, from the first image, a two-dimensional lateral location of the core on the end of the optical fiber.

At operation 1006, the system can cause, based on the two-dimensional lateral location, the first actuatable optical element to actuate to laterally align an optical path to the core. The method 1000 can repeat operations 1002 through 1006 as needed until the system can determine that the optical path is sufficiently aligned to the core. When the system has completed operation 1006, optical path is considered to be laterally aligned to the core (e.g., aligned in an x-y plane that is orthogonal to the optical path at the end of the optical fiber).

At operation 1008, the system can generate, with the imaging optics, a second image of the end of the optical fiber.

At operation 1010, the system can determine, from the second image, a longitudinal location of the core on the end of the optical fiber.

At operation 1012, the system can cause, based on the longitudinal location, the second actuatable optical element to actuate to bring the optical path to a focus at the end of the optical fiber. The method 1000 can repeat operations 1008 through 1006 as needed until the system can determine that the focus is sufficiently close to the end of the optical fiber. When the system has completed operation 1012, the focus of the optical path is considered to be longitudinally aligned to the end of the fiber (e.g., aligned in a z-direction that is parallel to the optical path at the end of the optical fiber).

In some examples, the first actuatable optical element can include a pivotable mirror. The method 1000 can optionally further include directing a light beam along the optical path to couple into the core of the optical fiber. The method 1000 can optionally further include, repeatedly performing at least the following three operations. First, the system can cause an angular position of the pivotable mirror to dither in two dimensions. Second, the system can sense an amount of light reflected from the core. In some examples, the second operation can be performed by a interrogator of a controller that is coupled to the system. Third, the system can adjust the angular position of the pivotable mirror to increase the amount of light reflected from the core.

In some examples, at least one of the controller or a processor included with the system can take measurements at a plurality of angular positions of the pivotable mirror (x, y) and/or a plurality of focus positions (z), measure the amount of light reflected from the core at each of the angular positions and/or focus positions, fit one or more curves to the measured amounts of light, and adjust the angular positions of the pivotable mirror and/or the focus adjustment to correspond to a local maximum of the one or more curves.

In some examples, the controller 10 can measure a reflected signal, using OFDR, at each location of the mirror search pattern. Various data processing techniques can be used to evaluate where the best fiber coupling is achieved (e.g., which separation between the focus of the light beam 120 and the end 106 of the optical fiber 108 provides the highest amount of light returning from the optical fiber 108 and therefore provides the highest coupling efficiency into the optical fiber 108).

In one technique, the controller 10 can sum the reflected amplitude in raw frequency domain data and report the overall reflected amplitude. Such a technique will work, but it is possible to additionally exclude some relatively large background signals. The techniques described below can exclude these relatively large background signals and can therefore increase a signal-to-noise ratio of the coupling efficiency measurement.

In another technique, the controller 10 can select a section of the reflected amplitude in the time domain, or optical delay domain, that represents a section of the optical fiber 108 with gratings in the cores, and sum over the selected section. For example, in the time domain, because the horizontal axis corresponds to round-trip propagation time, reflections arising from optical interfaces (such as an interface between glass and air, such as a face of a lens or window) show up as peaks along the horizontal axis. As such, the controller 10 can effectively ignore the peaks arising from these optical interfaces, and analyze data arising from light that is reflected from locations along the length of the optical fiber 108. The controller 10 can sum the reflected amplitude for data arising from reflection(s) from along the length of the optical fiber 108, and exclude data arising from reflection(s) from the end 106 of the optical fiber 108 or from other optical surfaces. Selecting which data to use in this manner can increase sensitivity, compared to using all the light that returns to the controller 10. For example, selecting which data to use in this manner can show a higher signal (e.g., above a noise level) only when light is coupled into the optical fiber 108 and is reflecting from the grating structures along the length of the optical fiber 108.

In still another technique, the controller 10 can select the entire optical fiber 108 region in the time domain in which gratings are present, transform the data into the frequency domain, such as by Fast Fourier Transform, and sum the amplitude only over the spectral region in which the gratings reflect. Processing the amplitude data in this manner can help reduce or eliminate low-level broadband reflected amplitude that can arise from connector reflections and other optical interfaces.

A computer-readable medium can store instructions that, when executed by a processor of a system for directing light into an optical fiber, cause the processor to execute operations. The system can include an actuatable optical element that defines an optical path. The optical path can extend to the actuatable optical element and can further extend to the end of the optical fiber. The operations can include at least the following four operations. First, the system can generate, with imaging optics, an image of an end of the optical fiber. Second, the system can determine, from the image, a location in the image of a specified feature in the image. Third, the system can cause the actuatable optical element to actuate to align the optical path to a core of the optical fiber based on the location of the specified feature in the image. Fourth, the system can direct a light beam along the optical path to couple into the core of the optical fiber.

Although the various aspects of the present invention have been described with respect to a preferred embodiment, it will be understood that the invention is entitled to full protection within the full scope of the appended claims.

What is claimed is:

1. A system for directing light emitted by first optical cores of a first light source into second optical cores of an optical fiber sensor, the system comprising:
   a first objective element and a second objective element for directing the light from the first optical cores along respective optical paths;
   an actuatable optical element disposed between the first objective element and the second objective element;
   a second light source configured to direct illumination toward an end of the optical fiber sensor, such that the illumination reflects or scatters from the end as reflected or scattered illumination, wherein the illumination has an illumination wavelength differing from a wavelength of the light emitted by the first optical cores;
   a focusing element and an imaging array configured to form, from the reflected or scattered illumination, an image of the end; and
   a control system comprising one or more processors, the control system configured to perform operations comprising:
      determining a location of a specified feature in the image, and
      causing, based on the location, an actuation of the actuatable optical element to align the optical paths with the respective second optical cores.

2. The system of claim 1, wherein the first light source comprises:
   an optical fiber comprising the first optical cores and a cladding surrounding the first optical cores; or
   a bundle of optical fibers, each optical fiber of the bundle comprising an optical core of the first optical cores.

3. The system of claim 1, further comprising:
   a physical barrier, the physical barrier comprising a window configured to separate the second objective element from the optical fiber sensor.

4. The system of claim 1, wherein the specified feature comprises an aspect selected from the group consisting of:
   a circumferential edge of the end of the optical fiber sensor,
   an azimuthal locating feature on a circumference of the end; and
   a core of the second optical cores.

5. The system of claim 1, wherein:
   the first objective element comprises a first objective lens, and the second objective element comprises a second objective lens; or
   the first objective element comprises a first parabolic mirror, and the second objective element comprises a second parabolic mirror.

6. The system of claim 1, wherein the actuatable optical element comprises a pivotable mirror.

7. The system of claim 6, wherein the pivotable mirror is located telecentrically relative to the second objective element, such that pivoting the pivotable mirror produces lateral translation of the optical paths at the end of the optical fiber sensor without producing a change in angle of the optical paths at the end of the optical fiber sensor.

8. The system of claim 1, wherein the actuatable optical element comprises a first pivotable mirror and a second pivotable mirror, the first and second pivotable mirrors physically configurable to together steer the light from the first optical cores towards a center of the second objective element.

9. The system of claim 1, wherein causing the actuation of the actuatable optical element comprises:
   determining an offset between the location and a predetermined target location of the specified feature in the image; and
   causing the actuation based on the offset.

10. The system of claim 9, wherein the target location is determined by registering the image to settings of the actuatable optical element during calibration, the calibration comprising:
    coupling the light from the first optical cores into respective cores of the second optical cores; and
    coupling back-reflected light from the second optical cores into the first optical cores as the settings of the actuatable optical element are being scanned.

11. The system of claim 1, wherein:
    the light emitted by the first optical cores is first light;
    the wavelength of the light emitted by the first optical cores is a first wavelength;
    the first light source is configured to inject second light having a visible second wavelength different from the first wavelength into a set of source optical cores, the set of source optical cores comprising cores selected from the group consisting of: one or more of the first optical cores and one or more additional optical cores not used to emit the first light;
    the image is further formed from a reflection of the second light off the end of the optical fiber sensor, such that the image further comprises sub-images of multiple cores of the set of source optical cores;
    the specified feature in the image comprises sub-images of multiple cores of the optical fiber sensor; and
    causing the actuation of the actuatable optical element to align the optical paths with the respective second optical cores comprises: causing the actuation to superimpose the sub-images of the multiple core of the optical fiber sensor with the sub-images of the multiple cores of the set of source optical cores.

12. The system of claim 1, wherein:
    the light emitted by the first optical cores is first light;
    the wavelength of the light emitted by the first optical cores is a first wavelength;
    the first light source is configured to inject second light having a visible second wavelength different from the first wavelength into a source optical core selected from the group consisting of: the first optical cores, and one or more additional optical cores not used to emit the first light;
    the image is further formed from a reflection of the second light off the end of the optical fiber sensor, such that the image further comprises a sub-image of the selected source optical core;
    the specified feature in the image comprises a sub-image of a core of the optical fiber sensor; and
    causing the actuation of the actuatable optical element to align the optical paths with the respective second optical cores comprises: causing the actuation to superimpose the sub-image of the core of the optical fiber sensor with the sub-image of the selected source optical core.

13. The system of claim 1, wherein:
    the reflected or scattered illumination comprises illumination that propagates along the optical paths and is collimated, by the second objective element, into collimated reflected or scattered illumination;
    the system further comprises: a dichroic mirror disposed in the optical paths between the first objective element and the second objective element, wherein the collimated reflected or scattered illumination is redirected, by the dichroic mirror, away from the optical paths as redirected reflected or scattered illumination; and
the focusing element is located in a path of the redirected reflected or scattered illumination and configured to focus the redirected illumination onto the imaging array.

14. The system of claim 13, wherein:
the dichroic mirror is disposed between the actuatable optical element and the first objective element; and
causing the actuation of the actuatable optical element to align the optical paths with the respective second optical cores comprises:
determining an offset between the location of the specified feature in the image and a predetermined target location in the image; and
causing the actuation to reduce the offset.

15. The system of claim 1, wherein:
the first light source comprises a source optical fiber, the source optical fiber comprising the first optical cores;
the second light source is a first illumination light source, and the illumination wavelength is a first illumination wavelength;
the system further comprises: a third light source configured to direct second illumination at an end of the source optical fiber at a second illumination wavelength, such that the second illumination reflects or scatters off the end of the source optical fiber in a direction along the optical paths, to be collimated by the first objective element and then to be redirected by a dichroic mirror away from the optical paths to become redirected second illumination;
the second illumination wavelength differs from the first illumination wavelength, and differs from the wavelength of the light emitted by the first optical cores; and
the system further comprises: a reflector configured to reflect the redirected second illumination towards the focusing element to cause the reflected redirected second illumination to be focused onto the imaging array, such that an image of the end of the source optical fiber is superimposed with the image of the end of the optical fiber sensor.

16. The system of claim 1, wherein:
the system further comprises: an interrogator to analyze reflected light, the reflected light being reflected along a length of the second optical cores of the optical fiber sensor and coupled back into the first optical cores of the first light source;
the interrogator is configured to determine a magnitude or amplitude of the reflected light; and
the operations further comprise: after an initial alignment of the optical paths with the respective second optical cores based on the location of the specified feature in the image, causing another actuation of the actuatable optical element based on the magnitude or amplitude of the reflected light, to further align the optical paths with the respective second optical cores.

17. The system of claim 1, further comprising:
a sensor for sensing, based on a second image of the reflected or scattered illumination, a longitudinal separation between the end of the optical fiber sensor and a focus of the light coupled from the first optical cores into the respective cores of the second optical cores; and
a position adjustor configured to adjust a position of the focus to reduce the longitudinal separation.

18. The system of claim 17, wherein:
the position adjustor comprises a variable focus lens disposed in the optical paths, and the operations further comprise: adjusting the position of the focus by causing the variable focus lens to adjust a collimation of the light; or
the position adjustor comprises an actuator configured to move the second objective element, and the operations further comprise: adjusting the position of the focus by causing the actuator to move the second objective element; or
the sensor comprises a bi-prism configured to impart a wedge angle between opposing halves of the reflected or scattered illumination and create duplicate features in the second image, and the operations further comprise: determining, based on a spacing between the duplicate features, the longitudinal separation; or
the second light source is configured to illuminate the end of the fiber at a plurality of wavelengths, the sensor comprises a split-field dichroic filter or a chromatically aberrated lens and is configured to create duplicate features at two different wavelengths in the second image, and the operations further comprise: determining, based on a spacing between the duplicate features, the longitudinal separation.

19. A system for directing light emitted by first optical cores of a multicore optical fiber into second optical cores of an optical fiber sensor, the system comprising:
a first objective element and a second objective element for directing the light from the first optical cores along respective optical paths;
an actuatable optical element disposed between the first objective element and the second objective element;
a second light source configured to direct illumination toward an end of the optical fiber sensor, such that the illumination reflects or scatters from the end of the optical fiber sensor, propagates along the optical path, and is collimated by the second object objective element into collimated reflected or scattered illumination, wherein the illumination has an illumination wavelength differing from a wavelength of the light emitted by the first optical cores;
a dichroic mirror disposed in the optical paths between the first objective element and the second objective element and configured to redirect the collimated reflected or scattered illumination away from the optical paths as redirected reflected or scattered illumination;
a focusing element and an imaging array located in a path of the redirected reflected or scattered illumination and configured to form, from the redirected reflected or scattered illumination, an image of the end of the optical fiber sensor; and
a control system comprising one or more processors, the control system configured to perform operations comprising:
determining a location of a specified feature in the image, and
causing, based on the location, an actuation of the actuatable optical element to align the optical paths with the respective second optical cores.

20. The system of claim 19, wherein:
the dichroic mirror is disposed between the actuatable optical element and the first objective element; and
causing the actuation of the actuatable optical element to align the optical paths with the respective second optical cores comprises:

determining an offset between the location of the specified feature in the image and a predetermined target location in the image; and
causing the actuation to reduce the offset.

* * * * *

UNITED STATES PATENT AND TRADEMARK OFFICE
CERTIFICATE OF CORRECTION

Page 1 of 1

PATENT NO. : 12,399,357 B2
APPLICATION NO. : 18/008094
DATED : August 26, 2025
INVENTOR(S) : Gifford et al.

It is certified that error appears in the above-identified patent and that said Letters Patent is hereby corrected as shown below:

In the Claims

In Column 21, Line 43, in Claim 4, delete "sensor," and insert --sensor;-- therefor Signed and Sealed this
Thirtieth Day of September, 2025

John A. Squires
*Director of the United States Patent and Trademark Office*